(12) United States Patent
Hahn, III et al.

(10) Patent No.: US 9,801,176 B2
(45) Date of Patent: Oct. 24, 2017

(54) FDMA/TDMA ARCHITECTURE USING CHANNELIZER AND MATRIX POWER AMPLIFIER

(71) Applicant: THE BOEING COMPANY, Chicago, IL (US)

(72) Inventors: Carl J. Hahn, III, Inglewood, CA (US); Leonard Rosenheck, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 14/803,269

(22) Filed: Jul. 20, 2015

(65) Prior Publication Data

US 2017/0026961 A1    Jan. 26, 2017

(51) Int. Cl.
| H04L 5/20 | (2006.01) |
| H04W 72/04 | (2009.01) |
| H04B 7/185 | (2006.01) |
| H04B 7/204 | (2006.01) |
| H04B 7/26 | (2006.01) |

(52) U.S. Cl.
CPC .... *H04W 72/0446* (2013.01); *H04B 7/18515* (2013.01); *H04B 7/2041* (2013.01); *H04B 7/2046* (2013.01); *H04B 7/2615* (2013.01)

(58) Field of Classification Search
CPC ...................................... H04J 1/00; H04J 3/16
USPC ............................ 370/200–488; 455/3.1, 5.1
See application file for complete search history.

(56) References Cited

U.S. PATENT DOCUMENTS

| 4,858,225 A | 8/1989 | Desantis |
| 4,931,802 A | 6/1990 | Assal et al. |
| 6,434,361 B1 * | 8/2002 | Carrozza .............. H04B 7/2125 370/324 |
| 7,542,716 B2 | 6/2009 | Bell et al. |
| 2014/0092804 A1 | 4/2014 | Scott |

FOREIGN PATENT DOCUMENTS

EP    1058410    12/2000

OTHER PUBLICATIONS

European Extended Search Report, European Application No. 16173717.6, dated Dec. 12, 2016.
(Continued)

*Primary Examiner* — Iqbal Zaidi
(74) *Attorney, Agent, or Firm* — Perman & Green, LLP

(57) ABSTRACT

A communication system including at least one first TDMA high speed switch having a first switch output, a FDMA channelizer, configured to receive an input RF signal from the at least one first TDMA high speed switch, at least one matrix power amplifier having at least one input and at least one output, and at least one second TDMA high speed switch having a second switch input coupled to a respective one of at least one channelizer output and at least one second switch output coupled to a corresponding input of the at least one matrix power amplifier, the at least one second TDMA high speed switch being configured to receive an output RF signal from the FDMA channelizer and transmit the output RF signal to a selected input of the at least one matrix power amplifier, wherein each predetermined output is coupled to a corresponding antenna beam.

20 Claims, 15 Drawing Sheets

(56) References Cited

OTHER PUBLICATIONS

Clayton, et al. "Frequency and Slot Switching in FDMA/TDMA Multiple Beam Satellite Processors"; IEEE Proceedings of MILCOM 2002; DOI: 10.1109/MILCOM.2002.1180408.
"WINDS (Wideband InterNetworking engineering test and Demonstration Satellite) / Kizuna"; https://directory.eoportal.org/web/eoportal/satellite-missions/v-w-x-y-z/winds ; ESA 2000-2015, 19 pages.

\* cited by examiner

FDMA/TDMA ARCHITECTURE USING CHANNELIZER AND MATRIX POWER AMPLIFIER

BACKGROUND

Generally, in the field of telecommunications, communication transmissions are facilitated by the use of communication platforms (e.g. relay stations). These communication platforms include any vehicle, manned or unmanned, that passes over, or hovers over a territorial coverage region, ranging from typical altitudes of manned and unmanned aircraft (UAVs) and lighter than air (LTA) platforms, to communication satellites in any orbit, not just of the Earth but of any celestial object such as the Moon or Mars. Typically, communication platforms function on the bent-pipe principle, where the communication platform receives signals from the ground via receive antenna beams and return signals back to Earth via transmit antenna beams with only amplification and a shift from the uplink or downlink frequency. However, as the world begins to increasingly demand greater bandwidth and greater throughput due to the advancement of internet traffic, e-commerce, computers and other digital technologies, the existing architectures are increasingly more impractical or expensive. For example, existing examples of high throughput multi-beam communication platforms operating exclusively in frequency division multiple access (FDMA) are commonplace, but the demands made on the architectures are increasingly stretching the cost and practicality of the architecture. In the case of high throughput multi-beam communication platforms operating exclusively in FDMA, the architecture requires a large number of antenna beams to provide the frequency reuse required to maximize total throughput. The architecture also has large numbers of high power amplifiers, complex high power switch networks and complex filter networks that are often waveguide-based and large in mass and size. All of these factors contribute to high power, volume and mass demands, where power, volume and mass are limited on a spacecraft. Conventional FDMA architecture also produces high heat demands due to, for example, complex thermal dissipation systems for high power components.

Other examples of conventional communication platform architectures that may include multiport amplifier systems include regenerative repeaters operating in asynchronous transfer mode (ATM) with an ATM Switch for switching, routing, and multiplexing. However, these communication architectures typically require RF signals to be demodulated and remodulated, creating a bandwidth throughput bottleneck. Because of the bottlenecks, these communication architectures are suitable for low data rate performance and are not well suited for broadband architectures. These ATM systems also include fixed routing through the ATM switch and the burden of routing the RF signals from the reception antenna beam to the broadcast antenna beam is placed on the communication architecture itself, which is highly inefficient and increases complexity and power usage of the satellite. These ATM systems also often use fixed dwell times (e.g. fixed time division multiple access (TDMA) time frames for each antenna beam) limiting the overall bandwidth available to the system.

In beam hopping platform switch time division multiple access (PS-TDMA) systems, RF signals are routed to individual beams sequentially in time rather than simultaneously at different frequencies as in FDMA systems. The total traffic capacity of the antenna beam is dependent on the dwell time in addition to or instead of the fraction of frequency bandwidth allocated in the beam. Beam hopping PS-TDMA architectures also replace complex microwave input multiplexer and output multiplexer filter networks typically used in FDMA systems. However, Beam Hopping PS-TDMA architectures still face challenges in providing a cost-effective way for routing high RF power to antenna beams only for the time period of TDMA dwell time. Conventional beam hopping PS-TDMA architectures are implemented with high power amplifiers dedicated to single antenna beams, which present a significant burden on communication platform power supplies. The high power amplifiers used in conventional beam hopping PS-TDMA architectures further exacerbate power use concerns as the power supplies for high power amplifiers cannot switch on and off at the switching rates of typical TDMA frames and, consequently, must remain on even when no RF signal is present. In conventional beam hopping PS-TDMA architectures where high power amplifiers can be switched between antenna beams, the high power switch networks that are coupled to the high power amplifiers increase mass, occupy volume and must address high RF power considerations such as thermal dissipation, hot switching, ohmic loss and multipaction.

SUMMARY

Accordingly, a system and method, intended to address the above-identified concerns, would find utility.

One example of the present disclosure relates to a communication system including at least one first time division multiple access (TDMA) high speed switch having a first switch output, a frequency division multiple access (FDMA) channelizer, coupled to the first switch output and configured to receive an input radio frequency (RF) signal from the at least one first TDMA high speed switch, the FDMA channelizer further having at least one channelizer output, at least one matrix power amplifier having at least one input and at least one output, and at least one second TDMA high speed switch having a second switch input coupled to a respective one of the at least one channelizer output and at least one second switch output coupled to a corresponding input of the at least one matrix power amplifier, the at least one second TDMA high speed switch being configured to receive an output RF signal from the FDMA channelizer and to transmit the output RF signal from the FDMA channelizer to a selected input of the at least one matrix power amplifier, wherein each input of the at least one matrix power amplifier is mapped to a predetermined output of the at least one matrix power amplifier and each predetermined output is coupled to a corresponding antenna beam.

One example of the present disclosure relates to a communication system including at least one first time division multiple access (TDMA) high speed switch having a first switch output, a frequency division multiple access (FDMA) channelizer, coupled to the first switch output and configured to receive an input radio frequency (RF) signal from the at least one first TDMA high speed switch, the channelizer further having at least one channelizer output, at least one second TDMA high speed switch having a second switch input coupled to a respective one of the at least one channelizer output, and at least one switchless broadcast module including at least one matrix power amplifier having at least one input and at least one output, and at least one antenna connected to the at least one matrix power amplifier, wherein the at least one second TDMA high speed switch further has at least one second switch output coupled to a selected input of the at least one matrix power amplifier, the at least one second TDMA high speed switch being configured to receive an output RF signal from the FDMA channelizer and to transmit the output RF signal from the FDMA channelizer to a selected input of the at least one matrix power amplifier, and wherein each input of the at least one matrix power amplifier is mapped to a predetermined output of the at least one matrix power amplifier and each predetermined output is coupled to a corresponding antenna.

One example of the present disclosure relates to a method for communications including receiving an input radio frequency (RF) signal from at least one input source with at least one first time division multiple access (TDMA) high speed switch, transmitting the input RF signal from the at least one first TDMA high speed switch to a frequency division multiple access (FDMA) channelizer, receiving an output RF signal, from the FDMA channelizer, with at least one second TDMA high speed switch, transmitting the output RF signal from the at least one second TDMA high speed switch to a selected input of at least one matrix power amplifier, mapping the output RF signal from the selected input to a predetermined output of the matrix power amplifier, and outputting the output RF signal to the antenna beam corresponding to the predetermined output of the matrix power amplifier.

BRIEF DESCRIPTION OF THE DRAWINGS

Figure 1:
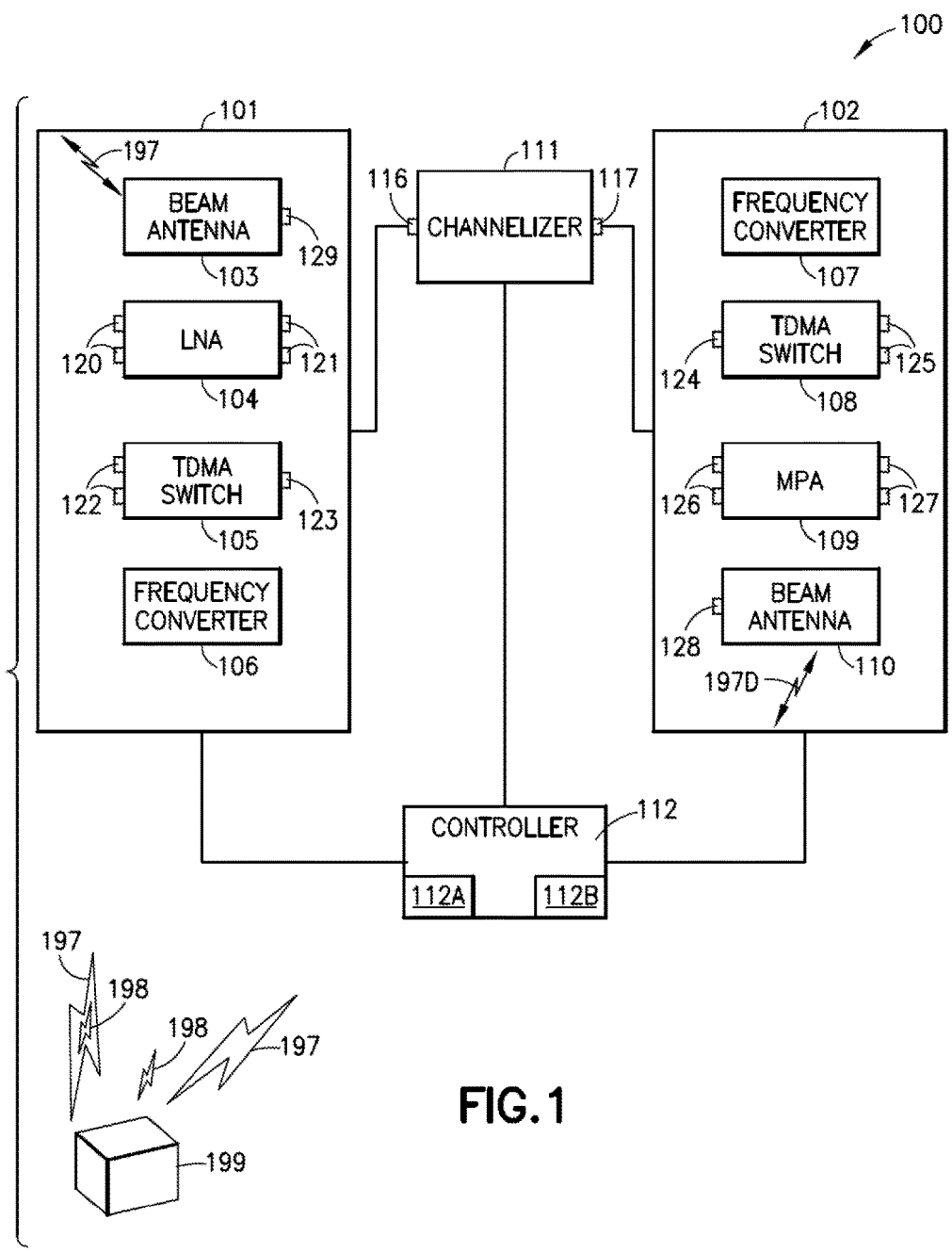
Figure 1A:
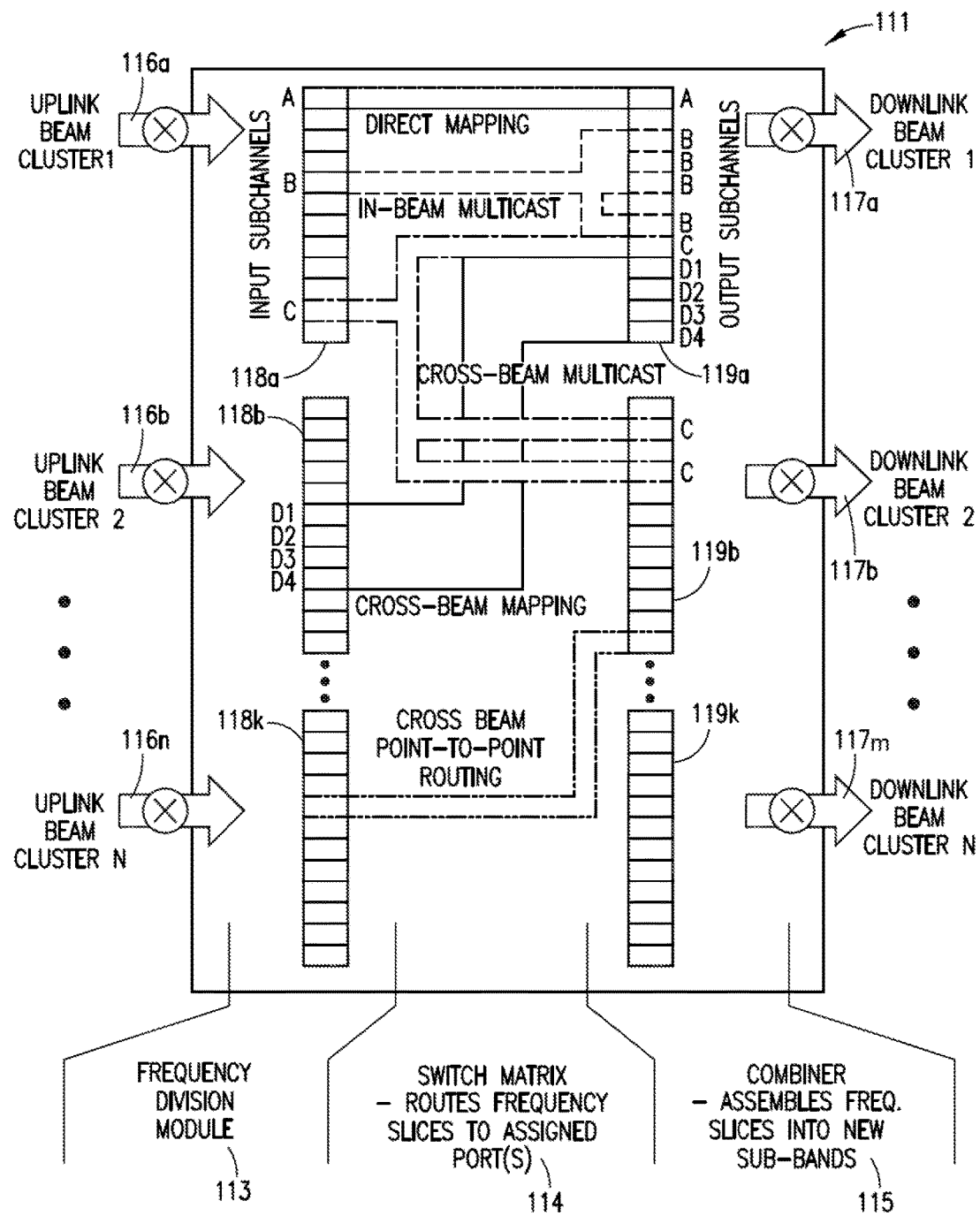
Figure 1B:
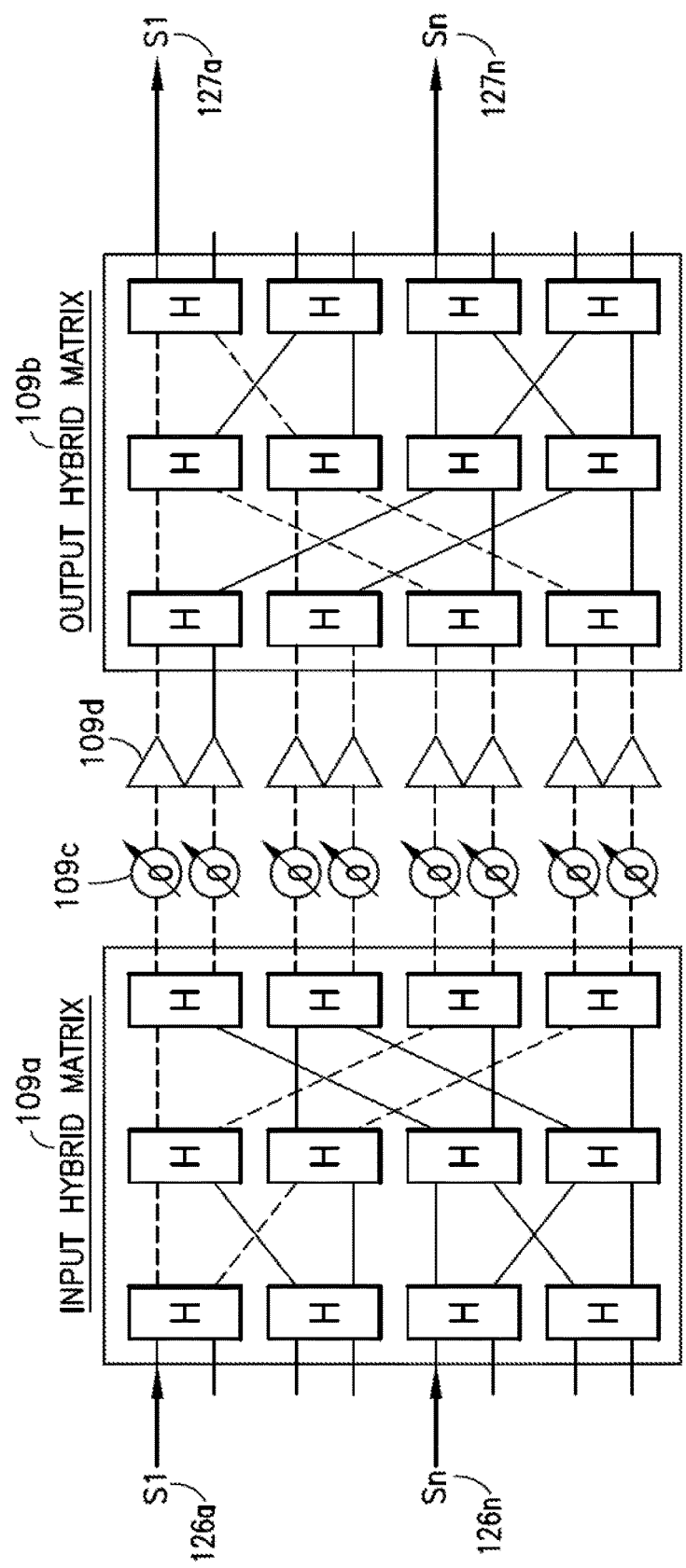
Figure 2:
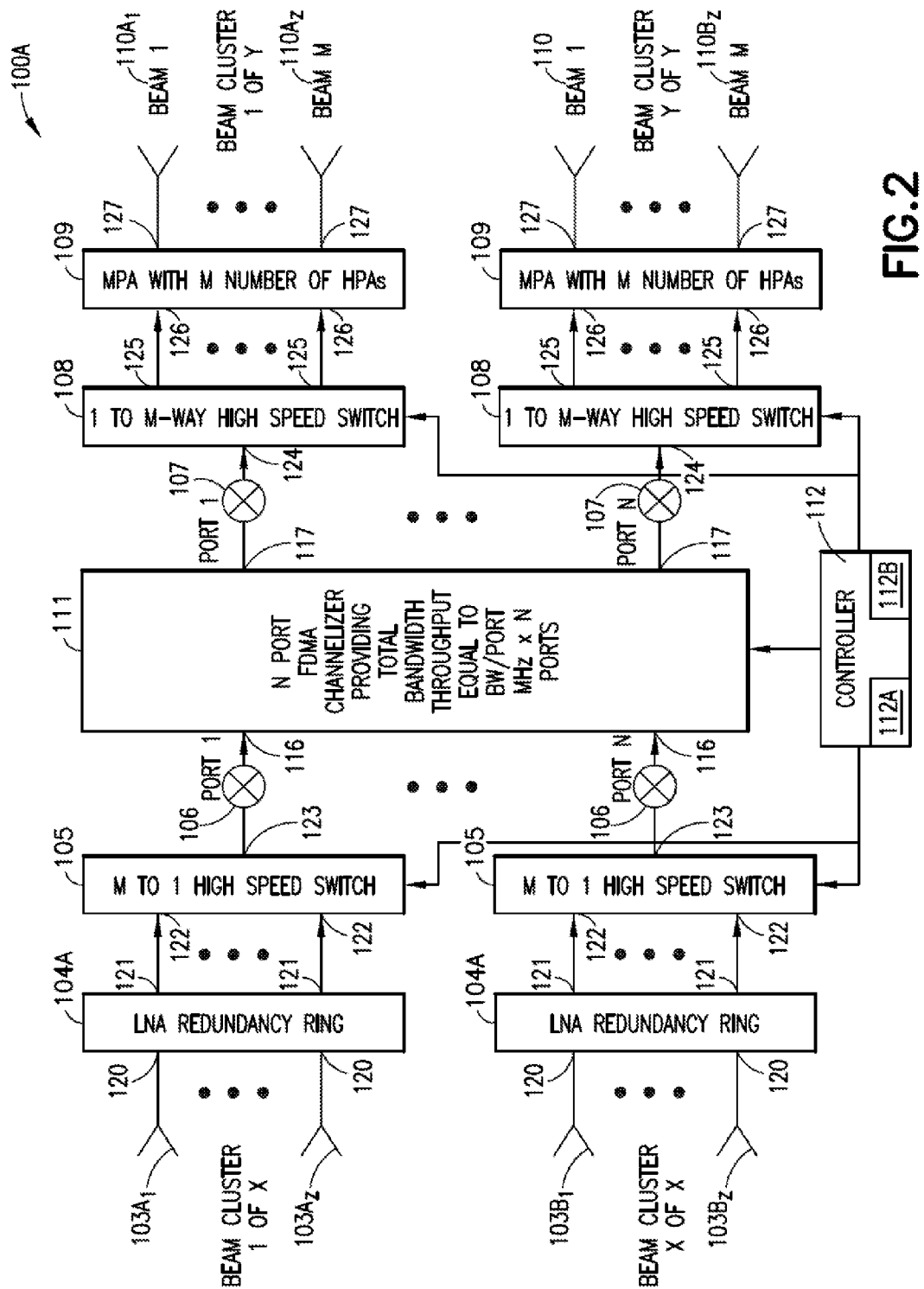
Figure 3:
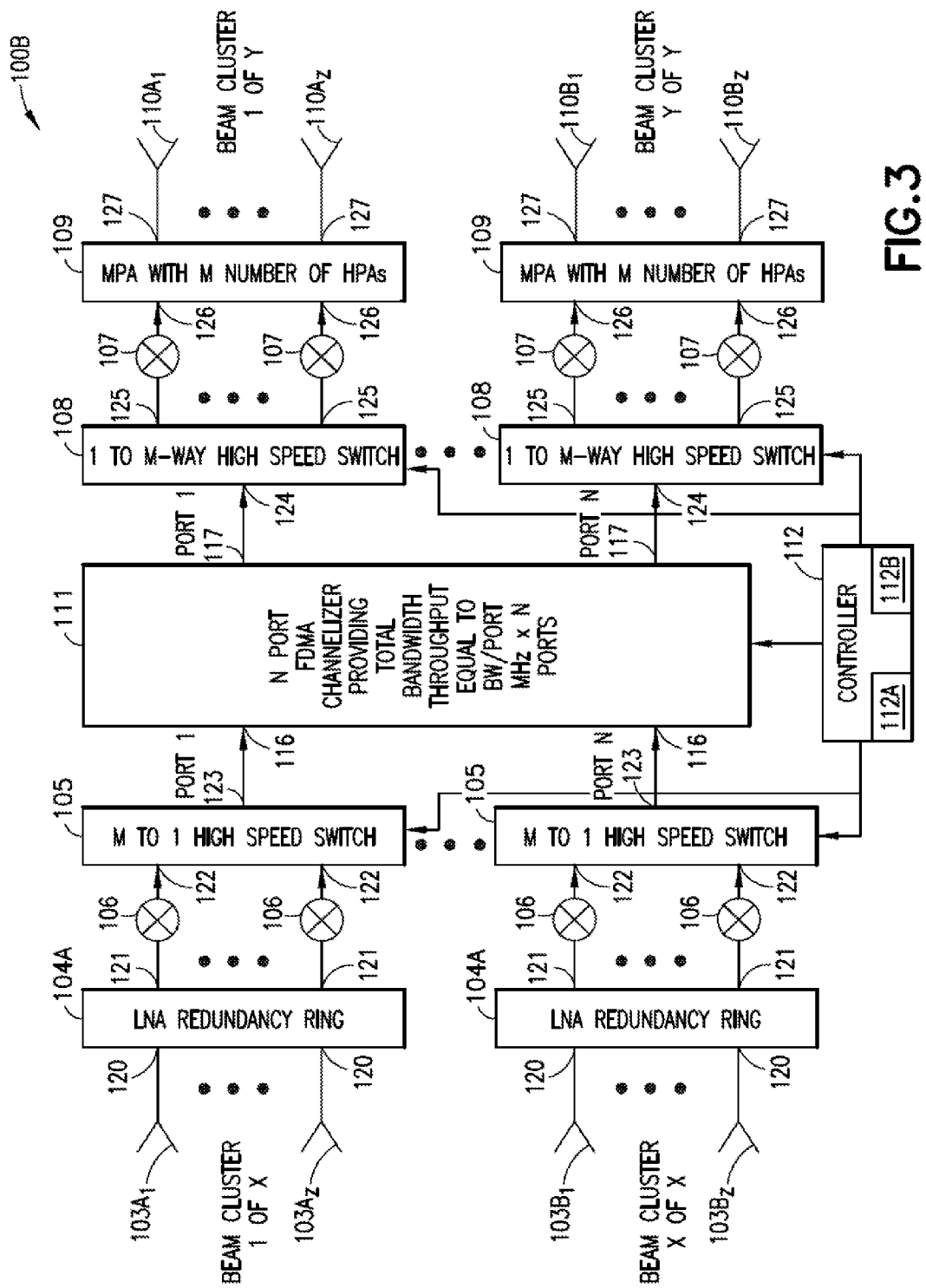
Figure 4:
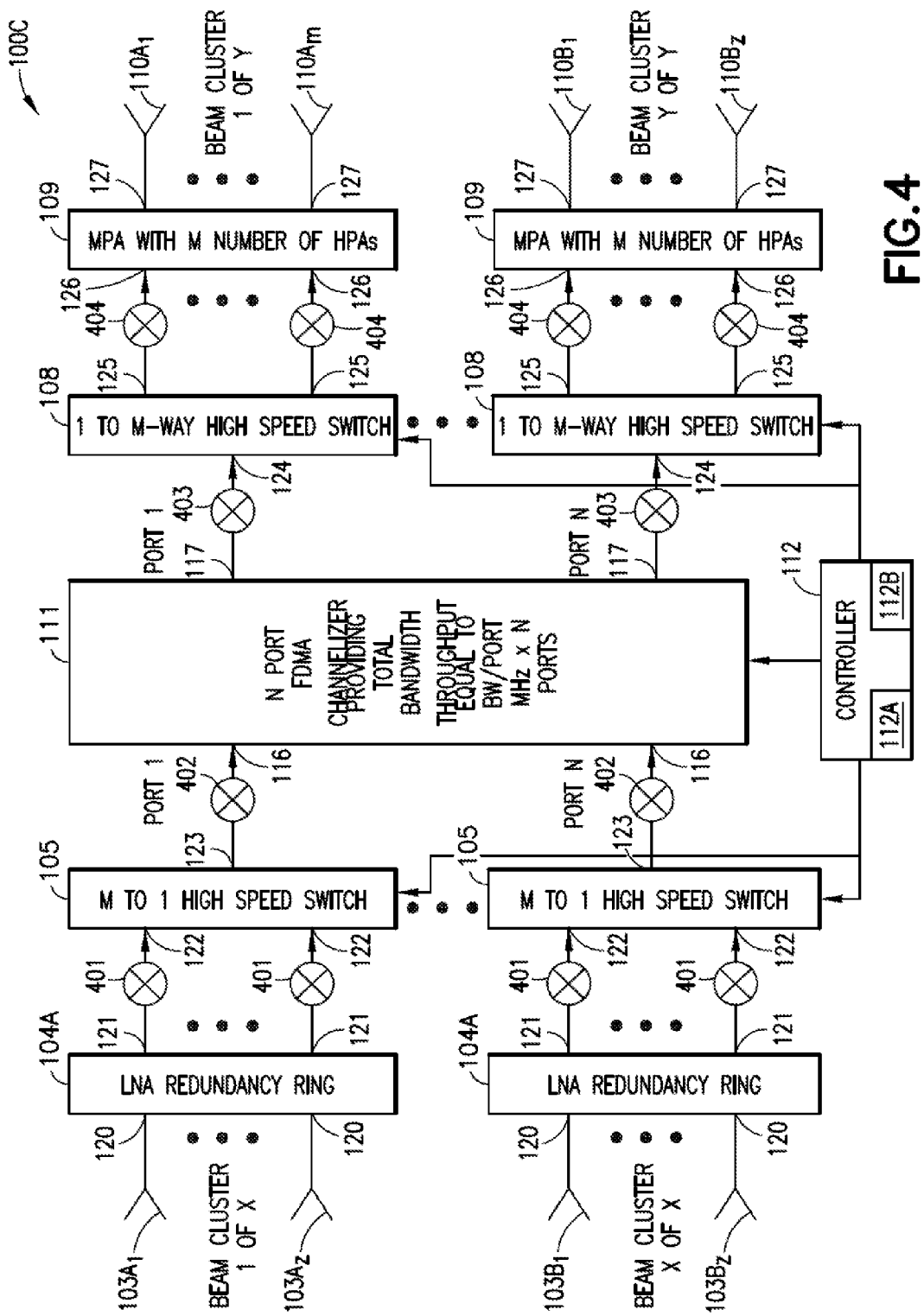
Figure 5:
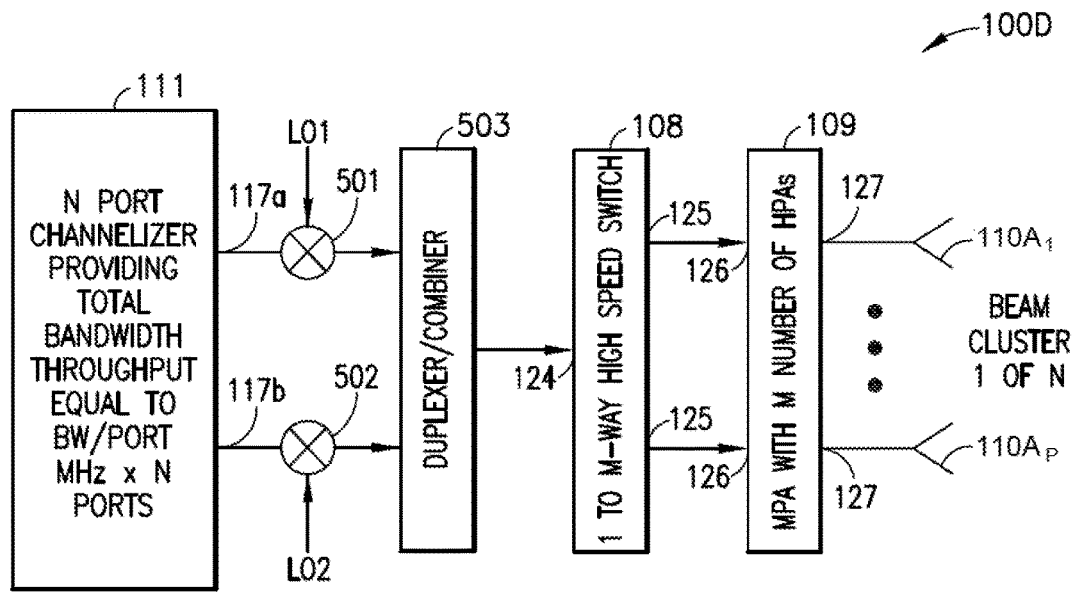
Figure 5A:
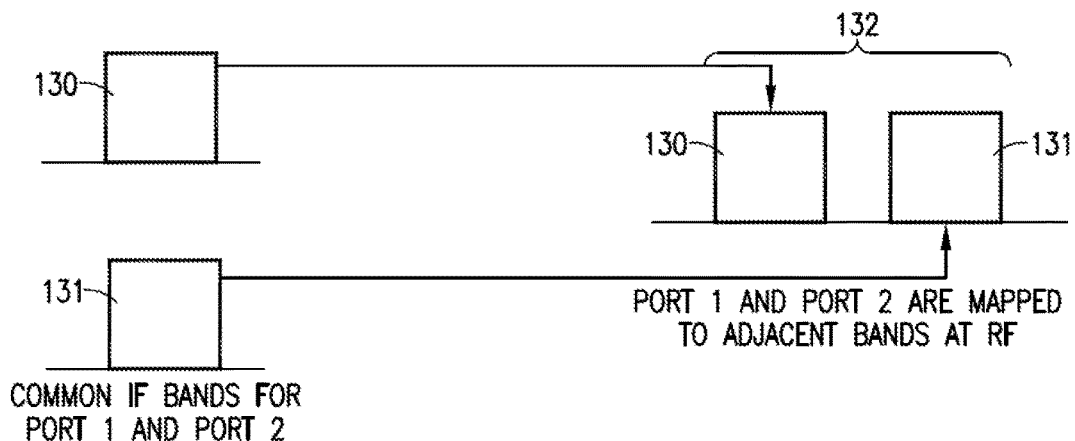
Figure 6:
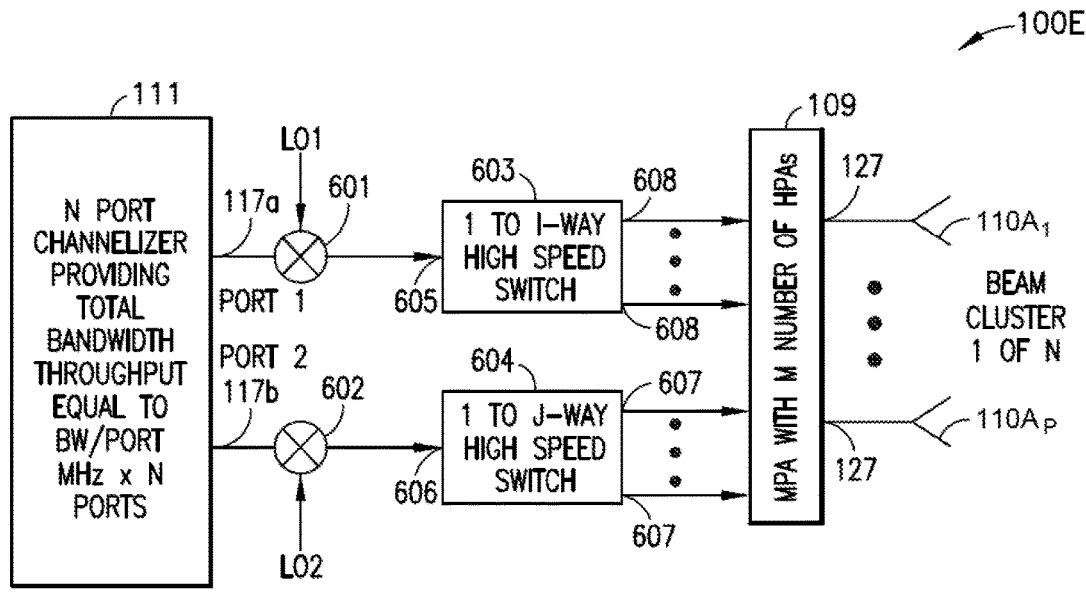
Figure 6A:
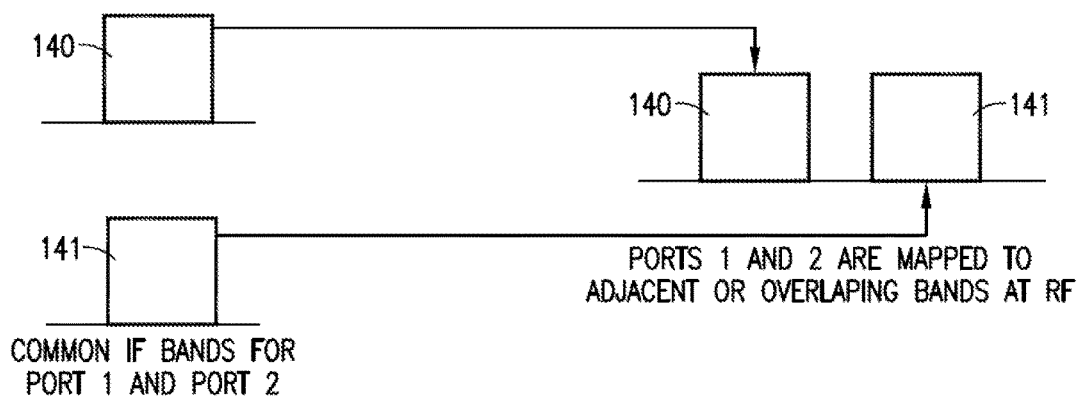
Figure 7:
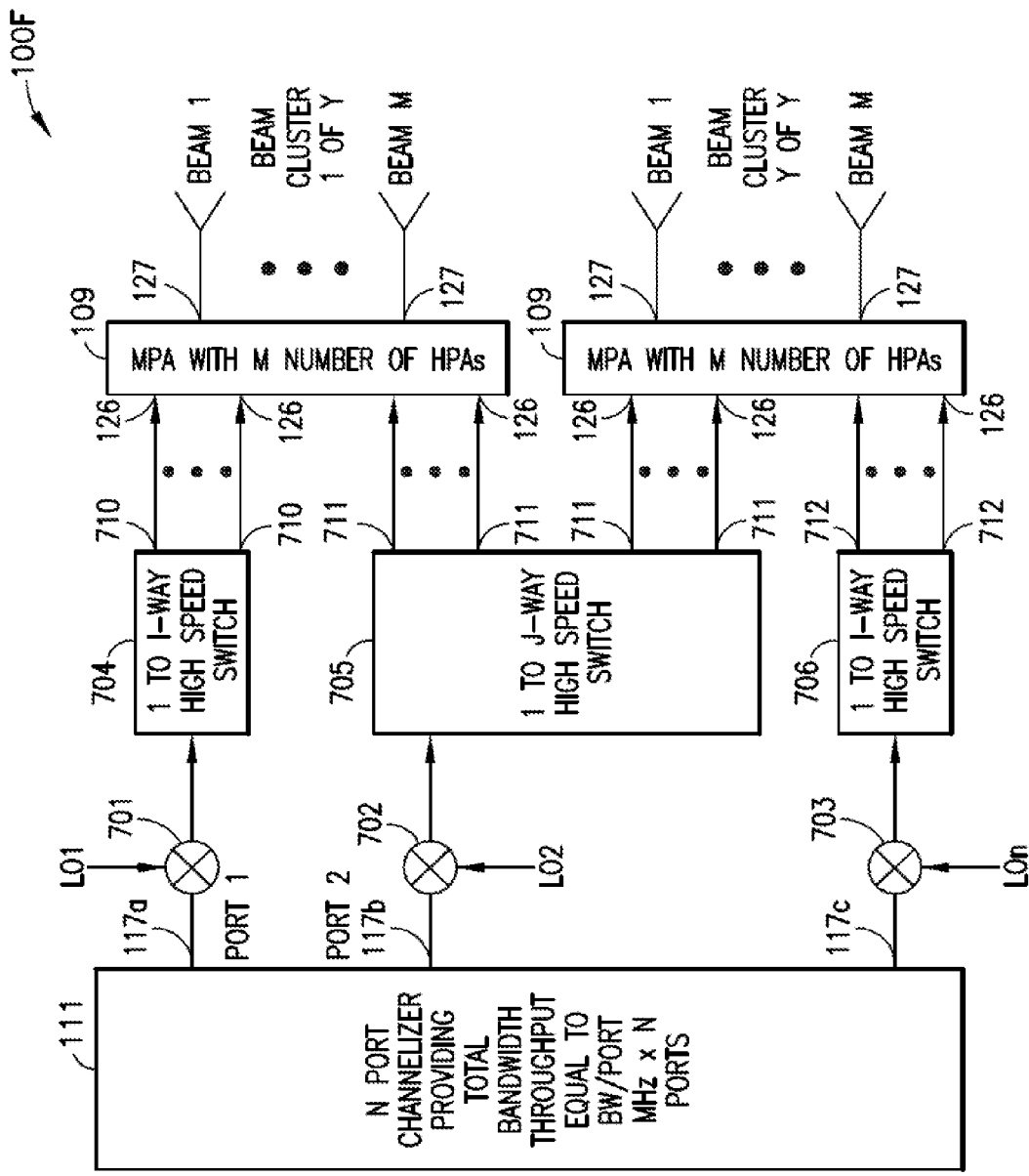
Figure 8:
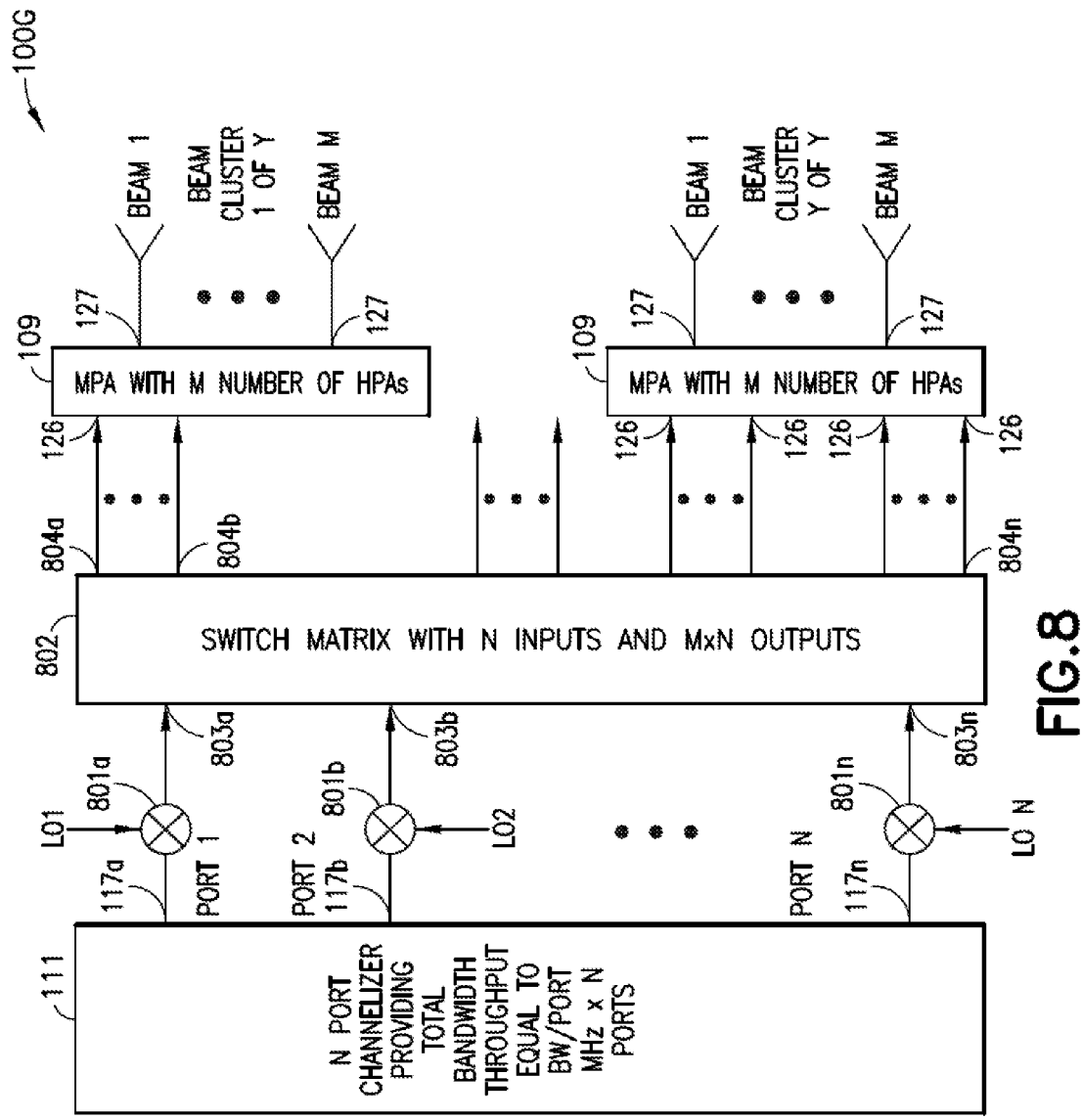
Figure 9:
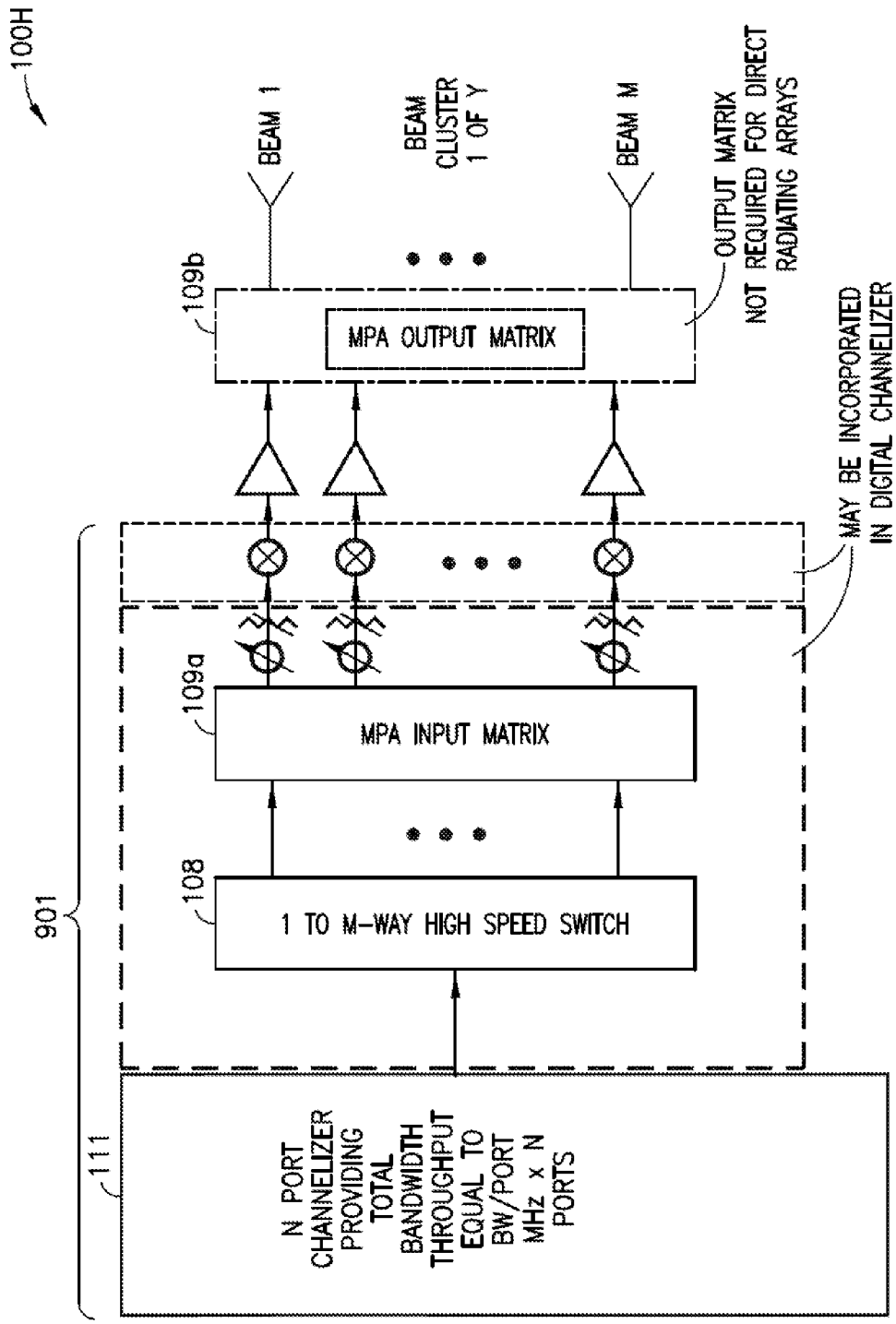
Figure 10:
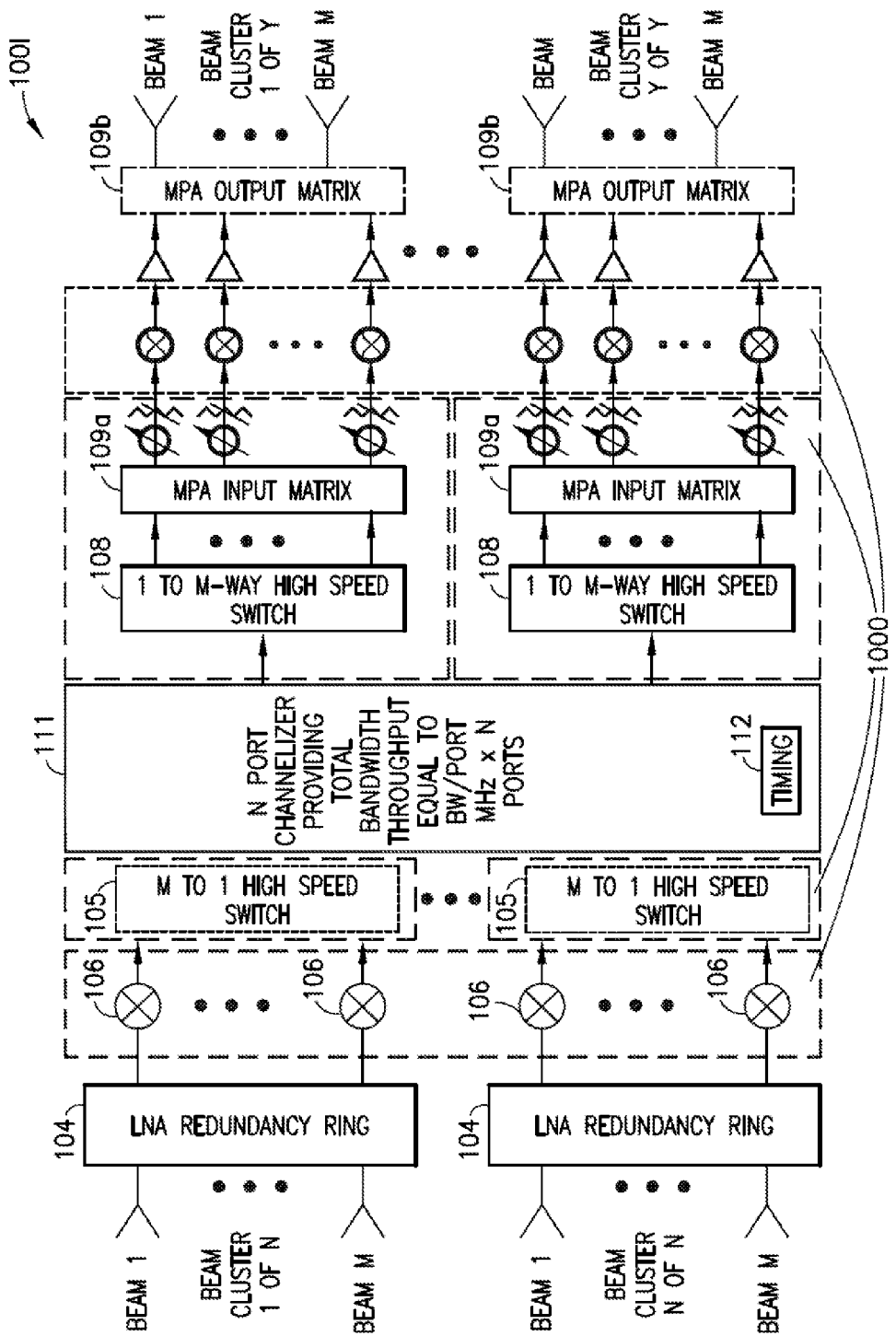
Figure 11:
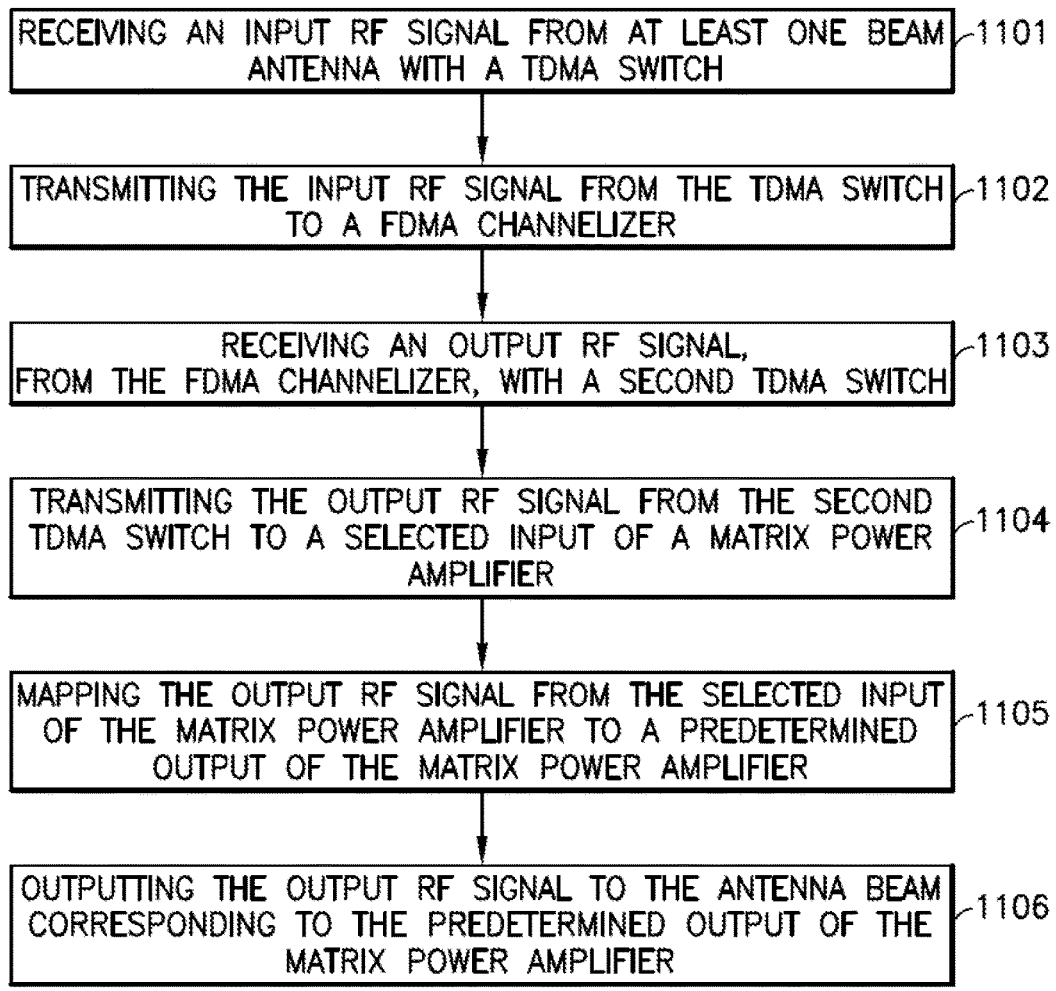
Figure 12:
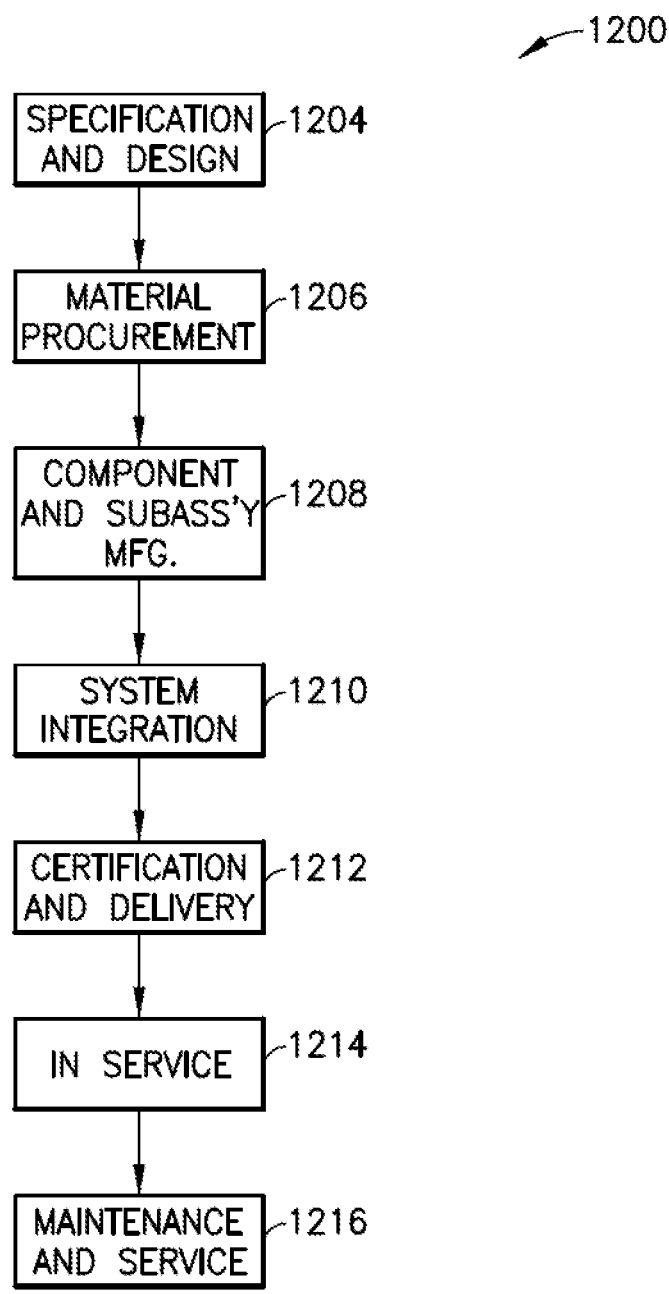
Figure 13:
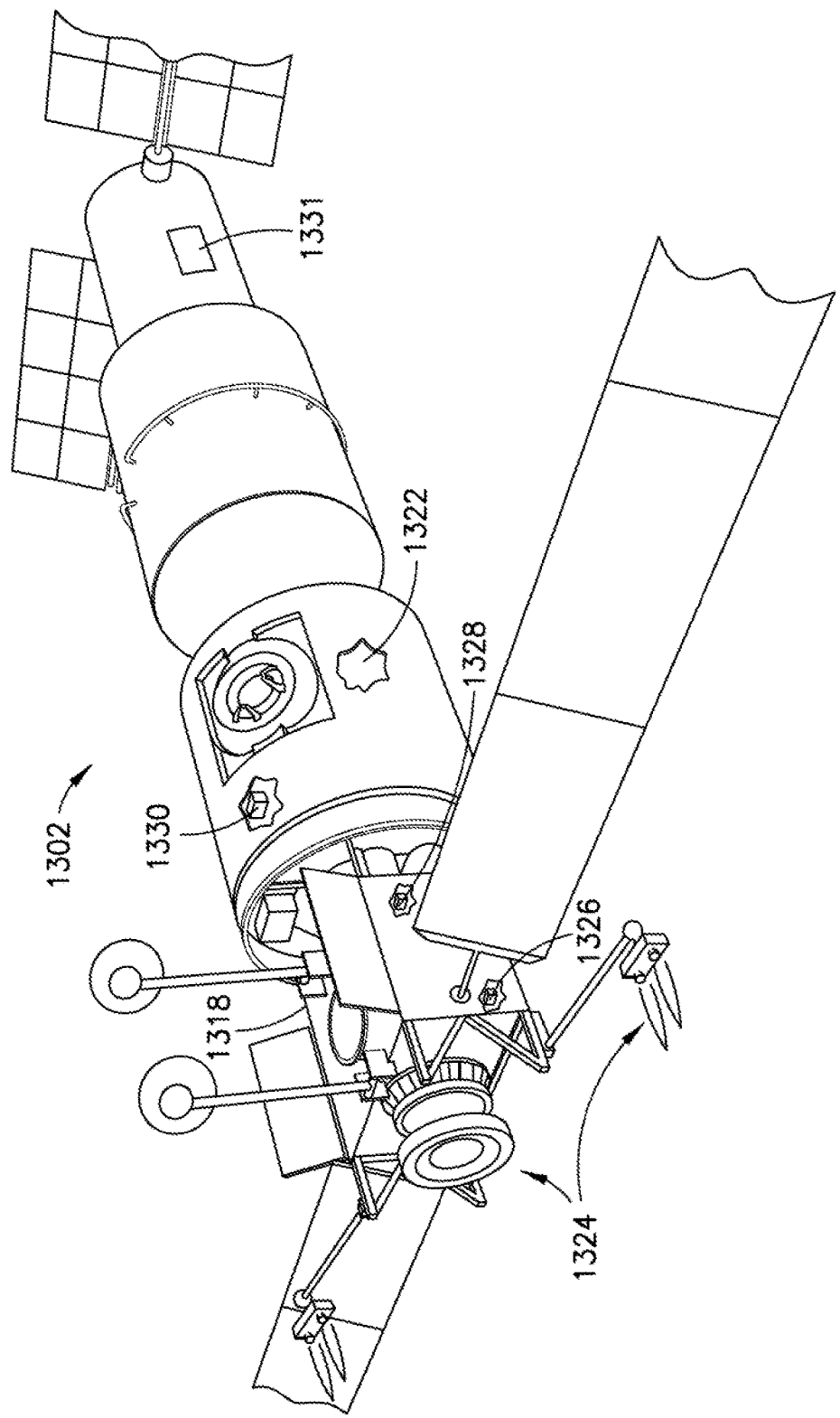

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a communications system according to one aspect of the present disclosure;

FIG. 1A is a schematic illustration of a channelizer of the communications system according to one aspect of the present disclosure;

FIG. 1B is a schematic illustration of a matrix power amplifier of the communications system according to one aspect of the present disclosure;

FIG. 2 is a schematic illustration of the communications system according to one aspect of the present disclosure;

FIG. 3 is a schematic illustration of the communications system according to one aspect of the present disclosure;

FIG. 4 is a schematic illustration of the communications system according to one aspect of the present disclosure;

FIGS. 5 and 5A are schematic illustrations of portions of the communications system according to one aspect of the present disclosure;

FIGS. 6 and 6A are schematic illustrations of portions of the communications system according to one aspect of the present disclosure;

FIG. 7 is a schematic illustration of a portion of the communications system according to one aspect of the present disclosure;

FIG. 8 is a schematic illustration of a portion of the communications system according to one aspect of the present disclosure;

FIG. 9 is a schematic illustration of a portion of the communications system according to one aspect of the present disclosure;

FIG. 10 is a schematic illustration of the communications system according to one aspect of the present disclosure;

FIG. 11 is a flow diagram of an operation of the communications system according to one aspect of the present disclosure;

FIG. 12 is a flow diagram of spacecraft production and service methodology according to one aspect of the present disclosure; and FIG. 13 is a schematic illustration of a spacecraft including distributed vehicle systems according to one aspect of the present disclosure.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring to FIG. 1, the aspects of the present disclosure described herein provide for a satellite communications system 100 having a combined FDMA/TDMA beam hopping communication architecture. While, in one aspect of the present disclosure, the satellite communication system 100 is described as part of a satellite architecture, it is understood that, in other aspects, the satellite communication system 100 can be part of any aerial or orbital communications platform, for example, a long-term unmanned aerial vehicle or a lighter-than-air dirigible vehicle. The satellite communications system 100 includes an uplink receiver module 101 and a downlink transmitter module 102 which are coupled to each other through a channelizer 111.

Referring to FIG. 1, a satellite controller 112 is provided to control aspects of the operations of the satellite communication system 100. The satellite controller 112 controls the operation of the uplink receiver module 101, the downlink transmitter module 102 and the channelizer 111 and, more specifically, the satellite controller 112 controls how an RF signal (e.g. in one aspect, a TDMA signal), received by the uplink receiver module 101, is routed to the beam antennas 110 of the downlink transmitter module 102. In one aspect of the present disclosure, the satellite controller 112 includes a time synchronization module 112B and a satellite controller memory 112A. In one aspect of the present disclosure, the time synchronization module 112B synchronizes communication between the uplink receiver module 101, the downlink transmitter module 102 and the channelizer 111. In one aspect, the time synchronization module 112B provides a time synchronization signal to the uplink receiver module 101, the downlink transmitter module 102 and the channelizer 111. In one aspect of the present disclosure, the time synchronization signal generated by the time synchronization module 112B is derived from a control signal 198 from a terrestrial (or other ground-based) source 199 that is received by the satellite controller 112. In one aspect of the present disclosure, the control signal 198 received from the terrestrial source 199 provides instructions to the satellite controller 112 for routing a RF communication signal 197 (e.g. a TDMA signal) from the beam antennas 103 of the uplink receiver module 101 to the beam antennas 110 of the downlink transmitter module 102 and/or for controlling the duration of dwell times of a TDMA time frame when broadcasting a communication signal 197D from the beam antennas 110. In one aspect of the present disclosure, the control signal 198 from the terrestrial source 199 is carried along with (e.g. sent substantially simultaneously) the RF communication signals 197 received by the uplink receiver module 101, while in other aspects, the control signal 198 and the RF communication signals 197 are sent sequentially, one after the other. In still other aspects, the control signal 198 is sent prior to any RF communication signals 197 being received by the satellite within a predetermined time period. For example, in one aspect, the control signal 198 is received by the satellite controller 112 in substantially real time, (e.g. the control signal 198 is received to control the routing through the satellite communication system 100 at substantially the same time as the RF communication signals 197 are received) so that the control signal 198 corresponds to a given transmission. In other aspects, the satellite controller 112 receives one or more control signals 198 in advance and stores the data provided by the control signal 198 within the satellite controller memory 112A. Here, the control signal 198 corresponds to transmissions that will be made within a predetermined time period (e.g. minutes, hours, days, etc.) where the routing for each transmission through the satellite communication system 100 for the predetermined period is stored in the satellite controller memory 112A as, for example, a routing table or in any other format that allows the controller 112 to correlate a RF communication signal 197 with a corresponding time slot and beam antenna 110. In one aspect, the control signal 198 reconfigures the satellite controller 112 depending on the transmissions to be made.

Referring to FIG. 1, in one aspect, the uplink receiver module 101 includes one or more beam antennas 103, one or more low noise amplifiers (LNA) 104, one or more TDMA switches 105 and one or more frequency converters 106. In one aspect of the present disclosure, the beam antennas 103 are satellite antennas for receiving the RF communication signal 197 from a signal source such as the terrestrial source 199. In one aspect of the present disclosure, beam antennas 103 are spot beam antennas, while in other aspects, the beam antennas 103 are multi-beam feeds or phased array antennas. In one aspect, the beam antennas 103 are an input source. In one aspect of the present disclosure, the RF communications signals 197 received by the beam antennas 103 are TDMA signals. In one aspect of the present disclosure, the TDMA signals received by the beam antennas 103 are transmitted to the one or more low noise amplifiers 104 via a beam antenna output 129. The low noise amplifiers 104 receive the TDMA signal through a LNA input 120 and, in turn, amplify the TDMA signals. In one aspect of the present disclosure, there is one low noise amplifier 104 for each beam antenna 103. However, in other aspects, one or more low noise amplifiers 104 are shared between multiple beam antennas 103. In one aspect of the present disclosure, there are multiple low noise amplifiers 104 for each uplink beam antenna 103 arranged in a redundancy ring configuration.

The uplink receiver module 101 further includes one or more TDMA switches 105. In one aspect of the present disclosure, the TDMA switches 105 have one switch output 123 and more than one switch inputs 122 for receiving a TDMA signal (e.g. from the low noise amplifier 104). In one aspect of the disclosed embodiment, the switch inputs 122 receive the TDMA signal from at least one input source comprising a plurality of input beams (e.g. beam antennas 103). In one aspect of the present disclosure, the TDMA switches 105 are high speed and low power TDMA switches for low power radio frequency applications of about 0 dBm or less. In other aspects, the TDMA switches 105 are, for example, high speed and high power TDMA switches. In one aspect, one or more frequency converters 106 are disposed between the low noise amplifier 104 and the channelizer 111 as described herein. In one aspect of the present disclosure, the one or more frequency converters 106 are local oscillators, but in other aspects, the one or more frequency converters 106 are any mechanism for shifting the frequency of a TDMA signal. In another aspect of the present disclosure, the TDMA switch 105 is permanently connected to a single path of the TDMA signal for the duration of a TDMA time frame so that, in effect, that the uplink receiver module 101 does not have a TDMA switch 105. In other aspects, the TMDA switch 105 is omitted as part of the uplink receiver module 101.

Referring still to FIG. 1, the uplink receiver module 101 is connected to a FDMA channelizer 111 (generally referred to as the channelizer 111). In one aspect of the present disclosure, each TDMA switch 105 is connected to a respective channelizer input 116 of the channelizer 111, where the channelizer 111 receives a TDMA signal from each TDMA switch 105. In other aspects, the channelizer 111 can have any predetermined number of channelizer inputs 116. In one aspect of the present disclosure, the channelizer 111 provides fixed or dynamic rerouting of the TDMA signal received from the TDMA switches 105 according, for example, to the time synchronization signal from the time synchronization module 112B of the satellite controller 112.

In one aspect, the channelizer 111 is configured to provide frequency division multiplexing for the TDMA signal received by the channelizer 111 from the TDMA switch 105. In one aspect of the present disclosure, frequency division multiplexing of the TDMA signal means that the channelizer 111 breaks the TDMA signal, received by the channelizer 111, to different frequency bands (e.g. input subchannels 118a-118k, FIG. 1A). The channelizer 111 is configured to reassemble the frequency bands (e.g. output subchannels 119a-119k, FIG. 1A) based on the routing of the frequency bands to a predetermined downlink beam antenna 110 of the downlink transmitter module 102.

Referring now to FIG. 1A, an exemplary diagram of a channelizer 111 is shown. In one aspect, the channelizer 111 includes N channelizer inputs 116a-116n and M channelizer outputs 117a-117m, where N and M are predetermined numbers greater than one. Each of the channelizer inputs 116a-116n is connected to a respective switch output 123 of the TDMA switches 105 (as described herein) and receives the TDMA signal from the respective TDMA switch 105. In one aspect, the channelizer 111 provides connectivity between the N channelizer inputs 116a-116n to each of the M channelizer outputs 117a-117m for K input and K output subchannels for each of the N channelizer inputs 116a-116n and the M channelizer outputs 117a-117m, where K is a predetermined number greater than one. In this aspect, the number of input subchannels 118a-118k and output subchannels 119a-119k are the same, but in other aspects, the number of input subchannels 118a-118k is different than the number of output subchannels 119a-119k. In one aspect, each of the channelizer inputs 116a-116n and each of the channelizer outputs 117a-117m have a predetermined bandwidth BW. In one aspect, the channelizer 111 includes a frequency division module 113, a switch matrix 114 and a combiner module 115. The frequency division module 113 divides the input sub-band spectrum of the TDMA signal(s) from each input 116a-116n into frequency slices and provides the frequency slices to the K input subchannels 118a-118k. The switch matrix 114 routes the frequency slices from the input subchannels 118a-118k to a predetermined one of K output subchannels 119a-119k. In one aspect of the present disclosure, the frequency slices from the input subchannels 118a-118k are sent to one of the output subchannels 119a-119k or broadcast to any of the channelizer outputs 117a-117m substantially simultaneously. As noted above, in one aspect, the routing is fixed in that the routing of the frequency slices remain the same depending on, for example, input. However, in other aspects, the routing of the frequency slices is configurable depending on, for example, the control signal 198 from the satellite controller 112, which, in one aspect, includes instructions for routing the frequency slices from the input subchannels 118a-118k to the output subchannels 119a-119k The combiner module 115 concatenates (or multiplexes) the frequency slices into appropriate output sub-bands (which, in one aspect, are different from the input sub-bands) and routes the output sub-bands to the respective output subchannels 119a-119k. In one aspect, connectivity between the channelizer inputs 116a-116n and the channelizer outputs 117a-117m is on the basis of subchannels that are less than or equal to the channelizer Bandwidth (BW) which, in one aspect, has units of megahertz (MHz). In one aspect, each channelizer input 116a-116n of the channelizer 111 divides the bandwidth of the channelizer input 116a-116n into K input subchannels 118a-118k. In one aspect, each of the K input subchannels 118a-118k can be sent to one of the M channelizer outputs 117a-117m or broadcast to any number of channelizer outputs 117a-117m substantially simultaneously. In one aspect, the K input subchannels 118a-118k can be concatenated to form contiguous channels of any number of K output subchannels 119a-119k. The output subchannels 119a-119k correspond to respective channelizer outputs 117a-117m of the channelizer 111, where the signal output from the channelizer output 117a-117m are provided to beam antennas 110 of the downlink transmitter module 102.

In one aspect, each of the channelizer outputs 117a-117m combine the K subchannels into the bandwidth of the port. In one aspect, the channelizer 111 has a capacity equal to the total throughput bandwidth (N×BW, where N and M are the same) multiplied by the number of bits per hertz given by a waveform choice and link capacity. In one aspect, a TDMA architecture allows the full bandwidth of the output ports 117a-117m to be sent to a single beam antenna 110 for the duration of a TDMA time frame with little interference from adjacent beams or intermodulation distortion, thus maximizing the channel capacity for a given bandwidth and radiated power. In one aspect, the channelizer 111 has a "mesh," "star," or mixed configuration, where any TDMA signal received by the channelizer inputs 116a-116n are routed to any channelizer output 117a-117m on a sub-channel by sub-channel basis. In one aspect, a "star" architecture is formed by assigning certain beams to gateway status and dwelling on them for longer periods of time and over wider bandwidths as necessary. In one aspect, the channelizer 111 is a digital channelizer 111, while in other aspects, the channelizer 111 is an analog channelizer. In other aspects, portions of the channelizer 111 are digital while other portions are analog. In one aspect, the channelizer 111 receives both TDMA and traditional FDMA signals as channelizer inputs 116. In one aspect, the channelizer 111 provides direct to RF band sampling and all functions, including amplification of a TDMA signal, are digitally incorporated into a digital processor.

Referring again to FIG. 1, the channelizer outputs 117a-117m transmit a resultant (e.g. an output) TDMA signal to the downlink transmitter module 102. In one aspect of the present disclosure, the downlink transmitter module 102 includes one or more TDMA switches 108 which receive a respective output TDMA signal from the channelizer outputs 117a-117m, one or more matrix power amplifiers (MPA) 109 which receive the outputs of the TDMA switches 108 and one or more beam antennas 110 which transmit the output of the matrix power amplifiers 109. In other aspects, the downlink transmitter module 102 also includes one or more frequency converters 107, substantially similar to the frequency converters 106 of the uplink receiver module 101, arranged between the channelizer 111 and the one or more matrix power amplifiers 109. In one aspect, the TDMA switches 108 select a predetermined matrix power amplifier input 126 of the matrix power amplifiers 109, enabling a predetermined matrix power amplifier output 127 of the matrix power amplifiers 109 to be routed to a predetermined beam antenna 110 without additional switching downstream of the matrix power amplifier 109 (e.g. high power switching). In one aspect, the power sharing flexibility of the matrix power amplifier 109 is maximized in the time domain rather than the frequency domain. In one aspect, the downlink transmitter module 102 eliminates bulky high power switching networks required to route high power signals of a single high power amplifier to multiple beam antennas 110 after amplification or the need to assign high power amplifiers to each individual beam antenna 110.

In one aspect of the present disclosure, each of the TDMA switches 108 includes a switch input 124 coupled to the respective channelizer output 117a-117m and receives the output TDMA signal from the channelizer 111. In one aspect of the present disclosure, the TDMA switches 108 allocate satellite resources to accommodate assigned bandwidth determined by the satellite controller 112. Each TDMA switch 108 includes one or more switch outputs 125 coupled to one or more matrix power amplifiers 109 as described herein. Each of the one or more switch outputs 125 corresponds to a selected input 126 of a matrix power amplifier 109. In one aspect of the present disclosure, the TDMA switch 108 is a low power (e.g. about 0 dBm or less) switch. In one aspect, the TDMA switch 108 is a high speed switch. In one aspect, the TDMA switch 108 is a high speed and low power switch. In one aspect of the present disclosure, the TDMA switch 108 determines how long a frequency band is sent to a downlink beam antenna 110 of the downlink transmitter module 102 based on the timing synchronization signal from the time synchronization module 112B.

As noted above, the switch outputs 125 of the TDMA switch 108 correspond to a selected matrix power amplifier input 126 (e.g. a predetermined input) of the matrix power amplifier 109. Referring now to FIG. 1B, an exemplary matrix power amplifier 109 is shown. In one aspect, the matrix power amplifier 109 includes an input hybrid matrix 109a (also known as an input power dividing network), an output hybrid matrix 109b that inverts the process of the input hybrid matrix 109a, trim adjusters 109c and high power amplifiers 109d. The trim adjusters 109c and high power amplifiers 109d operate in parallel and are disposed between the input hybrid matrix 109a and output hybrid matrix 109b. In one aspect, each matrix power amplifier input 126 of the matrix power amplifier 109 is mapped to a predetermined matrix power amplifier output 127 of the matrix power amplifier 109 (as described herein). In one aspect, multiple TDMA signals can be injected at multiple matrix power amplifier inputs 126 and routed to their respective matrix power amplifier outputs 127 substantially simultaneously. In one aspect, the frequency of the TDMA signal received at one of the matrix power amplifier inputs 126 is the same as the frequency of the TDMA signal received at any of the other matrix power amplifier inputs 126. However, in other aspects, the frequencies of the TDMA signal received by each of the matrix power amplifier inputs 126 are different, so long as the bandwidth of the high power amplifiers 109c and all other intervening components (for example, the trim adjuster 109c) encompass the bandwidth of the TDMA signal received by the matrix power amplifier inputs 126. In one aspect, the input hybrid matrix 109a is implemented digitally in a digital module. In one aspect, the matrix power amplifier 109 are implemented in direct radiating arrays as well as shaped aperture arrays where the function of the output hybrid matrix 109b is performed by antenna optics instead of a circuit.

Each of the respective matrix power amplifier outputs 127a-127n of the matrix power amplifier 109 is further coupled to a corresponding one of beam antennas 110. In one aspect, the beam antennas 110 are spot beam antennas. However, in other aspects, the beam antennas 110 are multi-beam feeds or phased array antennas. Each of the beam antennas 110 outputs the TDMA signal from the corresponding matrix power amplifier outputs 127a-127n of the matrix power amplifier 109 for a predetermined time. In one aspect of the present disclosure, the predetermined time is the dwell time of the TDMA signal and is controlled by the TDMA switch 108 based on the timing synchronization signal from the time synchronization module 121B. In one aspect of the present disclosure, the TDMA signal output from the matrix power amplifier outputs 127a-127n has a predetermined frequency and amplitude based on the timing synchronization signal from the time synchronization module 112B. In one aspect, the coupling between the channelizer 111 and the TDMA switches 108 and the coupling between the TDMA switches 108 and the matrix power amplifiers 109 provide a full bandwidth of the TDMA signal output by the channelizer 111 to the beam antenna 110 for a duration of the time division multiple access time frame (e.g. the dwell time). In one aspect, the time synchronization module 112B effects a full bandwidth of the channelizer 111 to be output to the antenna beam 110 for a duration of a time division multiple access time frame. In one aspect, there are equal numbers of beam clusters and beam antennas 110 within the downlink transmitter module 102 as there are beam clusters and beam antennas 103 in the uplink receiver module 101. However, in other aspects, there are different numbers of beam clusters and beam antennas 110 within the downlink transmitter module 102 from the number of beam clusters and beam antennas 103 in the uplink receiver module 101.

In one aspect of the present disclosure, one or more frequency converters 107 are disposed between the channelizer outputs 117 and the switch inputs 124 of the TDMA switches 108. In other aspects, one or more frequency converters 107 are disposed between the switch outputs 125 of the TDMA switch 108 and the matrix power amplifier inputs 126 of the matrix power amplifier 109. In yet other aspects, one or more frequency converters 107 are disposed between channelizer outputs 117 and the switch inputs 124 of the TDMA switches 108 and between the switch outputs 125 of the TDMA switch 108 and the matrix power amplifier inputs 126 of the matrix power amplifier 109. The frequency converters 107 are substantially similar to frequency converters 106 described herein.

Referring now to FIG. 2, an exemplary satellite communication system 100A is shown. In FIG. 2, multiple beam clusters 1-X are shown, each beam cluster 1-X corresponds to beam antennas $103A_{1-Z}$ and $103B_{1-Z}$, where Z is any predetermined number greater than 1. In one aspect, two sets of beam antennas $103A_{1-Z}$ and $103B_{1-Z}$ are shown, but in other aspects, there are any predetermined number of sets of beam antennas 103 corresponding to beam clusters 1-X. Each of the beam antennas $103A_{1-Z}$ and $103B_{1-Z}$ is coupled to the input 120 of a low noise amplifier redundancy ring 104A (as described herein). In one aspect of the present disclosure, the low noise amplifier redundancy rings 104A receive a TDMA signal from each beam antenna $103A_{1-Z}$ and $103B_{1-Z}$. In one aspect, each low noise amplifier redundancy ring 104A receives the TDMA signals from the beam antennas $103A_{1-Z}$ and $103B_{1-Z}$ associated with one of the beam clusters 1-X. For example, in one aspect, one of the low noise amplifier redundancy rings 104A receives beam antennas $103A_{1-Z}$ and $103B_{1-Z}$ associated with beam cluster 1. In other aspects, the low noise amplifier redundancy rings 104A receive a TDMA signal from beam antennas $103A_{1-Z}$ and $103B_{1-Z}$ associated with multiple beam clusters 1-X. The low noise amplifier redundancy rings 104A have LNA outputs 121 which are connected to the switch inputs 122 of the TDMA switches 105. In one aspect, one TDMA switch 105 is coupled to each low noise amplifier redundancy ring 104A. Each of the TDMA switches 105 also has a switch output 123 and switches the TDMA signal according to the timing synchronization signal from the time synchronization module 112B. In one aspect of the present disclosure, the switch outputs 123 of the TDMA switches 105 are coupled to frequency converters 106, located between the TDMA switch 105 and the channelizer 111, which are configured to change the frequency of the TDMA signal output by the TDMA switches 105. The channelizer 111 has channelizer outputs 117 connected to the frequency converters 107. The channelizer 111 outputs a resultant TDMA signal (e.g. an output TDMA signal) to the frequency converters 107 located between the channelizer 111 and the TDMA switch 108. The TDMA switch 108, based on the timing synchronization signal from the time synchronization module 112B, switches the TDMA signal to a switch output 125. The switch output 125 is connected to a predetermined matrix power amplifier input 126 of the matrix power amplifiers 109. In one aspect of the present disclosure, the predetermined matrix power amplifier input 126 of the matrix power amplifier 109 is mapped to a predetermined matrix power amplifier output 127 of the matrix power amplifier 109. The predetermined matrix power amplifier output 127 of the matrix power amplifier 109 is coupled to a corresponding downlink beam antenna $110A_{1-P}$ and $110B_{1-P}$ which, in turn, transmits the output TDMA signal as TDMA signal 197D. In one aspect, two sets of beam antennas $110A_{1-P}$ and $110B_{1-P}$ are shown, but in other aspects, there is any predetermined number of sets of beam antennas 110 corresponding to beam clusters 1-Y. In one aspect, the number of beam antennas $103A_{1-Z}$, $103B_{1-Z}$ is the same as the number of beam antennas $110A_{1-P}$, $110B_{1-P}$ (e.g. P is the same as Z), but in other aspects, the number of beam antennas $103A_{1-Z}$, $103B_{1-Z}$ is different than the number of beam antennas $110A_{1-P}$, $110B_{1-P}$ (e.g. P is different from Z).

Referring now to FIG. 3, another exemplary satellite communication system 100B is shown. The satellite communication system 100B shown in FIG. 3 is substantially similar to the exemplary satellite communication 100A shown in FIG. 2, except the frequency converters 106, 107 shown in FIG. 3 are disposed at different locations compared to the frequency converters 106, 107 shown in FIG. 2. In the aspect of the present disclosure shown in FIG. 3, the frequency converters 106 are disposed between the low noise amplifier redundancy ring 104A and the TDMA switch 105. Further, in the aspect shown in FIG. 3, the frequency converters 107 are disposed between the TDMA switch 108 and the matrix power amplifier 109.

Referring now to FIG. 4, yet another exemplary satellite communication system 100C is shown. The exemplary satellite communication system 100C is substantially similar to the exemplary satellite communications systems 100A and 100B. In one aspect, in FIG. 4, frequency converters 401 are disposed between the low noise amplifiers redundancy rings 104A and the TDMA switches 105 and frequency converters 402 are disposed between the TDMA switch 105 and channelizer 111. In one aspect shown in FIG. 4, frequency converters 403 are disposed between the channelizer 111 and the TDMA switch 108 and frequency converters 404 are disposed between the TDMA switch 108 and matrix power amplifier 109.

Referring now to FIGS. 5-5A, a portion of a satellite communications system 100D is shown. In one aspect of the present disclosure, multiple outputs 117a, 117b of the channelizer 111 are combined to form beams of wider bandwidths or multiple bands. In one aspect, the channelizer outputs 117a, 117b are connected to frequency converters 501, 502. The frequency converters 501, 502 receive the TDMA signals 130, 131 from the channelizer outputs 117a, 117b and output the respective TDMA signals 130, 131 to a duplexer/combiner 503. In one aspect, the frequency converters 501, 502 shift the TDMA signal 130, 131 to different frequencies. The frequency converters 501, 502, in combination with the duplexer/combiner 503, multiplex the TDMA signals 130, 131 from the channelizer outputs 117a, 117b into adjacent RF bands, forming beams of wider bandwidth, multiple bands or combined band 132 (see FIG. 5A). The combined band 132 from the duplexer/combiner 503 is output to the TDMA switch 108, which, in turn, switches the combined band 132 to a predetermined matrix power amplifier input 126 of the matrix power amplifier 109.

In one aspect, the matrix power amplifier 127 outputs to the respective beam antennas $110A_{1-P}$ and $110B_{1-P}$ through a respective matrix power amplifier output 127. In the aspect shown in FIG. 5, two channelizer outputs 117a, 117b are combined by the duplexer/combiner 503. However, in other aspects, any predetermined number of channelizer outputs 117 can be combined by the duplexer/combiner 503.

Referring now to FIGS. 6-6A, a portion of the satellite communication system 100E is shown. Multiple channelizer outputs 117a, 117b can be routed to a common matrix power amplifier 109 via distributed TDMA switches 603, 604. In one aspect, the channelizer 111 has channelizer outputs 117a, 117b. The channelizer outputs 117a, 117b are connected to frequency converters 601, 602. In one aspect of the present disclosure the frequency converters 601, 602 receive TDMA signals 140, 141 from the channelizer outputs 117a, 117b and shift the TDMA signals 140, 141 to substantially the same frequency or overlapping frequencies. However, in other aspects, the frequency converters 601, 602 shift the channelizer outputs 117a, 117b to different frequencies, extending the bandwidth of the matrix power amplifier 109. In one aspect of the present disclosure, the frequency converters 601, 602 are coupled to the switch inputs 605, 606 of the distributed TDMA switches 603, 604. The distributed TDMA switches 603, 604 have switch outputs 607, 608 which are connected to a respective predetermined matrix power amplifier input 126 of the matrix power amplifier 109. The matrix power amplifier 109, in turn outputs to a respective beam antenna $110A_{1-P}$ and $110B_{1-P}$ through the matrix power amplifier outputs 127. In one aspect, the channelizer outputs 117a, 117b can share the same frequency with the matrix power amplifier input 126, or can extend the bandwidth of the matrix power amplifier 109 similar to what is shown with respect to FIGS. 5-5A (i.e. frequency converters 601, 602 can be the same frequency or can be different frequencies and the bandwidth of the channelizer 111 is not as broad as the bandwidth of the matrix power amplifier 109). In one aspect, up to M channelizer outputs 117 (where M is a predetermined number greater than one) can be routed to a common matrix power amplifier 109, provided the number of switch outputs 607, 608 of the distributed TDMA switches 603, 604 add up to equal the number of matrix power amplifier inputs 126. In one aspect, up to M channelizer outputs 117 can be routed to a common matrix power amplifier 109 with M number of high power amplifiers 109c. In one aspect, the number of switch outputs 607, 608 of the TDMA switches 603, 604 add up to the number of matrix power amplifier inputs 126 of the matrix power amplifier 109. In the aspect shown in FIG. 6, two distributed TDMA switches 603, 604 shown. However, in other aspects of the present disclosures, any predetermined number of distributed TDMA switches can be used.

Referring now to FIG. 7, a portion of the satellite communication system 100F is shown. The aspect shown in FIG. 7 is substantially similar to the aspect shown in FIG. 6. However, in the aspect shown in FIG. 7, the channelizer 111 outputs to multiple matrix power amplifiers 109 via multiple distributed TDMA switches 704-706. In one aspect, each of the multiple distributed TDMA switches 704-706 receives a TDMA signal from channelizer outputs 117a-117c. In one aspect, one or more of the distributed TDMA switches 704-706 is common to more than one matrix power amplifiers 109. In other aspects of the present disclosure, one or more of the matrix power amplifiers 109 is common to more than one distributed TDMA switches 704-706. In one aspect of the present disclosure the frequency converters 701-703 shift the TDMA signals from the channelizer outputs 117a-

117c to the same frequency or overlapping frequencies. However, in other aspects, the frequency converters 701-703 shift the channelizer outputs 117a-117c to different frequencies. In one aspect, a channelizer output 117a-117c can be routed to multiple matrix power amplifiers 109 having M matrix power amplifier inputs 126 via distributed high speed switches 704-706. In one aspect, the channelizer outputs 117a-117c can share the same frequency with the matrix power amplifier inputs 126, or can extend the bandwidth of the matrix power amplifier 109 as shown with respect to FIGS. 5-5A (i.e. frequency converters 701-703 can be the same frequency or can be different frequencies). In one aspect, up to M channelizer outputs 117a-117c can be routed to as many matrix power amplifiers 109 as required. In one aspect, the sum total number of switch outputs 710-712 of the high speed switches 704-706 adds up to the total number of matrix power amplifier inputs 126 of the sum of the matrix power amplifiers 109.

Referring now to FIG. 8, a portion of the satellite communication system 100F is shown. The aspect shown in FIG. 8 is substantially similar to the aspect shown in FIG. 7. However, in one aspect, in place of multiple distributed TDMA switches 704-706, there is a single switch matrix 802 which receive any predetermined number of channelizer outputs 117a-117m and connects all of the channelizer outputs 117a-117m to each of the matrix power amplifier inputs 126. In one aspect of the present disclosure, the switch matrix 802 has H inputs 803a-803h (one for each output 117a-117m of channelizer 111) and I outputs 804a-804i, where I is the number of beam antennas 110 within a beam cluster 1-Y. The switch matrix 802, in one aspect of the present disclosure, is connected to more than one matrix power amplifiers 109, which are, in turn, connected to the respective beam antennas 110 within a beam cluster 1-Y. In one aspect of the present disclosure, the switch matrix 802 has a non-blocking switch matrix architecture and any channelizer output 117a-117m can be switched to any matrix power amplifier inputs 126 of the matrix power amplifiers 109. In some aspects of the present disclosure, there are any number of frequency converters 801a-801n, determined by a predetermined frequency reuse plan, the bandwidth of the channelizer 111 and occupied bandwidth of the matrix power amplifiers 109. In one aspect, the switch matrix 802 operates at the RF frequency of the matrix power amplifier 109 to minimize the number of frequency converters. In other aspects, the switch matrix 802 operates at the frequency band of the channelizer 111 and has a dedicated frequency converter for each matrix power amplifier input 126. In yet other aspects, the switch matrix 802 operates at an intermediate frequency with frequency converters disposed between the switch matrix 802 and the channelizer 111 and multiple frequency converters disposed between the switch matrix 802 and the matrix power amplifiers 109. In one aspect, the switch matrix 802 has more than one input 803a-803h. In one aspect, the frequency converters 801a-801n can be on the input 803a-803h side of the switch matrix 802 or on the output side 804a-804i of the switch matrix 802. In one aspect, depending on the bandwidth of the switch matrix 802, it is possible to implement a single switch matrix 802 that connects all of the output ports 117a-117m of the channelizer 111 to all of the matrix power amplifier inputs 126 of the matrix power amplifier 109. In one aspect, using a non-blocking switch matrix architecture, any channelizer output 117a-117m can be routed to any matrix power amplifier input 126. In one aspect, the number of frequency converter 801a-801n frequencies is determined by the frequency re-use plan, the bandwidth of the channelizer 111 and the occupied bandwidth of the matrix power amplifier 109. In one aspect, the architecture of the switch matrix 802 is generic in scope, with specific instantiations depending on particular system requirements.

Referring now to FIG. 9-10, in yet another aspect of the present disclosure is shown. In one aspect, the channelizer 111, hybrid MPA input matrix 109a and the TDMA switch 108 are integrated into a digital module 901. In other aspects, any of the low noise amplifiers 104, frequency converters 106, 107, TDMA switches 105, 108, channelizer 111, matrix power amplifiers 109, satellite controller 112 or any portion thereof can be combined and implemented as part of a digital module of a digital signal processing computer. In the portion of the exemplary satellite communication system 100H shown in FIG. 9, the digital module 901 includes the channelizer 111, TDMA switch 108 and the hybrid MPA input matrix 109a of a matrix power amplifier 109. In portion of the exemplary satellite communication system 100I shown in FIG. 10, the frequency converters 106, the TDMA switch 105, the channelizer 111, satellite controller 112, TDMA switch 108 and hybrid MPA input matrix 109a of the matrix power amplifier 109 are implemented as a digital module 1000.

Referring now to FIG. 11, an exemplary flow diagram of an operation of the satellite communications system 100 is shown. At block 1101, in one aspect, the TDMA switches 105 receive the input TDMA signal from the beam antenna 103 with the switch inputs 122. In one aspect of the present disclosure, the TDMA switches 105 also receive the time synchronization signal from the time synchronization module 112B of the satellite controller 112. The time synchronization signal determines how the TDMA signals received by the TDMA switches 105 are switched to the switch outputs 123 of the TDMA switch 105. At block 1102, the TDMA switch 105 transmits input TDMA signal to the channelizer 111. In one aspect, the channelizer 111 provides frequency division multiplexing for the input TDMA signal received by the channelizer 111 from the TDMA switch 105 and generates an output TDMA signal according to the control signal from the satellite controller 112. At block 1103, the channelizer 111 transmits the output TDMA signal to the TDMA switch 108. In one aspect, the TDMA switches 108 allocate satellite resources to accommodate assigned bandwidth for the output TDMA signal based on the control signal from the satellite controller 112. At block 1104, the TDMA switch 108 outputs the output TDMA signal to a selected matrix power amplifier input 126 of the matrix power amplifier 109. At block 1105, the matrix power amplifier 109 maps the output TDMA signal from the selected matrix power amplifier input 126 of the matrix power amplifier 109 to a predetermined matrix power amplifier output 127 of the matrix power amplifier 109. At block 1106, the output TDMA is output to the beam antenna 110 from the predetermined output 127 of the matrix power amplifier 109 as communications signal 197D.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of a spacecraft manufacturing and service method 1200 as shown in FIG. 12 and a spacecraft 1302 as shown in FIG. 13. During pre-production, illustrative method 1200 may include specification and design 1204 of the spacecraft 1302 and material procurement 1206. During production, component and subassembly manufacturing 1208 and system integration 1210 of the spacecraft 1302 take place. Thereafter, the spacecraft 1302 may go through certification and delivery 1212 to be placed in service 1214. While in service by a customer, the spacecraft 1302 is scheduled for routine maintenance and service 1216 (which may also include modification, reconfiguration, refurbishment, and so on).

Each of the processes of the illustrative method 1200 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

As shown in FIG. 13, the spacecraft 1302 produced by the illustrative method 1200 may include an airframe 1318 with a plurality of high-level systems and an interior 1322. Examples of high-level systems, which are distributed throughout the spacecraft, include one or more of a propulsion system 1324, an electrical power system 1326, a hydraulic system 1328, and an environmental system 1330 and the satellite communications relay system 1331. Any number of other systems may be included. Although an aerospace example is shown, the principles of the invention may be applied to other industries, such as the maritime industries.

The system and methods shown or described herein may be employed during any one or more of the stages of the manufacturing and service method 1200. For example, components or subassemblies corresponding to component and subassembly manufacturing 1208 may be fabricated or manufactured in a manner similar to components or subassemblies produced while the spacecraft 1302 is in service. Also, one or more aspects of the system, method, or combination thereof may be utilized during the production states 1208 and 1210, for example, by substantially expediting assembly of or reducing the cost of a spacecraft 1302. Similarly, one or more aspects of the system or method realizations, or a combination thereof, may be utilized, for example and without limitation, while the spacecraft 1302 is in service, e.g., operation, maintenance and service 1216.

Different examples and aspects of the system and methods are disclosed herein that include a variety of components, features, and functionality. It should be understood that the various examples and aspects of the system and methods disclosed herein may include any of the components, features, and functionality of any of the other examples and aspects of the system and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In accordance with one or more aspects of the present disclosure, a communication system including at least one first time division multiple access (TDMA) high speed switch having a first switch output, a frequency division multiple access (FDMA) channelizer, coupled to the first switch output and configured to receive an input radio frequency (RF) signal from the at least one first TDMA high speed switch, the FDMA channelizer further having at least one channelizer output, at least one matrix power amplifier having at least one input and at least one output, and at least one second TDMA high speed switch having a second switch input coupled to a respective one of the at least one channelizer output and at least one second switch output coupled to a corresponding input of the at least one matrix power amplifier, the at least one second TDMA high speed switch being configured to receive an output RF signal from the FDMA channelizer and to transmit the output RF signal from the FDMA channelizer to a selected input of the at least one matrix power amplifier, wherein each input of the at least one matrix power amplifier is mapped to a predetermined output of the at least one matrix power amplifier and each predetermined output is coupled to a corresponding antenna beam.

In accordance with one or more aspects of the present disclosure, wherein the coupling between the FDMA channelizer and the at least one second TDMA high speed switch and the coupling between the at least one second TDMA high speed switch the at least one matrix power amplifier are configured to provide a full bandwidth of the at least one channelizer output to the corresponding antenna beam for a duration of a time division multiple access frame.

In accordance with one or more aspects of the present disclosure, wherein the at least one matrix power amplifier is common to more than one second TDMA high speed switch.

In accordance with one or more aspects of the present disclosure, wherein the at least one second TDMA high speed switch is common to more than one matrix power amplifier.

In accordance with one or more aspects of the present disclosure, wherein the at least one matrix power amplifier includes an input matrix and an output matrix where at least the FDMA channelizer, input matrix and at least one second TDMA high speed switch are integrated into a digital module.

In accordance with one or more aspects of the present disclosure, wherein the at least one second high speed switch is a low power switch.

In accordance with one or more aspects of the present disclosure, wherein the low power switch is configured for low power radio frequency applications of about 0 dBm or less.

In accordance with one or more aspects of the present disclosure, further including a time synchronization module connected to the at least one first TDMA high speed switch, the FDMA channelizer and the at least one second TDMA high speed switch, and wherein the output RF signal is output from the at least one matrix power amplifier at a predetermined frequency and amplitude based on the time synchronization module.

In accordance with one or more aspects of the present disclosure, wherein the time synchronization module is configured to effect a full bandwidth of the FDMA channelizer to be output to the antenna beam for the duration of a TDMA time frame.

In accordance with one or more aspects of the present disclosure, wherein the at least one first TDMA high speed switch has at least one first switch input configured to receive the input RF signal from at least one input source comprising a plurality of input beams.

In accordance with one or more aspects of the present disclosure, further including a first frequency converter connected between the at least one input source and the at least one first switch input of the at least one first TDMA high speed switch and a second frequency converter connected between the first switch output of the at least one first TDMA high speed switch and the FDMA channelizer.

In accordance with one or more aspects of the present disclosure, further including a frequency converter connected between the first switch output of the at least one first TDMA high speed switch and the FDMA channelizer.

In accordance with one or more aspects of the present disclosure, further including a frequency converter connected between the at least one channelizer output of the FDMA channelizer and the second switch input of the at least one second TDMA high speed switch.

In accordance with one or more aspects of the present disclosure, wherein the at least one matrix power amplifier comprises a plurality of high power amplifiers.

In accordance with one or more aspects of the present disclosure, further including a first frequency converter connected between the at least one second switch output of the at least one second TDMA high speed switch and the at least one matrix power amplifier, and a second frequency converter connected between the FDMA channelizer and the second switch input of the at least one second TDMA high speed switch.

In accordance with one or more aspects of the present disclosure, a communication system including at least one first time division multiple access (TDMA) high speed switch having a first switch output, a frequency division multiple access (FDMA) channelizer, coupled to the first switch output and configured to receive an input radio frequency (RF) signal from the at least one first TDMA high speed switch, the channelizer further having at least one channelizer output, at least one second TDMA high speed switch having a second switch input coupled to a respective one of the at least one channelizer output, and at least one switchless broadcast module including at least one matrix power amplifier having at least one input and at least one output, and at least one antenna connected to the at least one matrix power amplifier, wherein the at least one second TDMA high speed switch further has at least one second switch output coupled to a selected input of the at least one matrix power amplifier, the at least one second TDMA high speed switch being configured to receive an output RF signal from the FDMA channelizer and to transmit the output RF signal from the FDMA channelizer to a selected input of the at least one matrix power amplifier, and wherein each input of the at least one matrix power amplifier is mapped to a predetermined output of the at least one matrix power amplifier and each predetermined output is coupled to a corresponding antenna.

In accordance with one or more aspects of the present disclosure, wherein the coupling between the FDMA channelizer and the at least one second TDMA high speed switch and the coupling between the at least one second TDMA high speed switch and the at least one matrix power amplifier are configured to provide a full bandwidth of the at least one channelizer output to the corresponding antenna for a duration of a time division multiple access frame.

In accordance with one or more aspects of the present disclosure, wherein the at least one switchless broadcast module is common to more than one second TDMA high speed switches.

In accordance with one or more aspects of the present disclosure, wherein the at least one second TDMA high speed switch is common to more than one switchless broadcast modules.

In accordance with one or more aspects of the present disclosure, wherein the at least one matrix power amplifier includes an input matrix and an output matrix where at least the FDMA channelizer, input matrix and at least one second TDMA high speed switch are integrated into a digital module.

In accordance with one or more aspects of the present disclosure, wherein the at least one second TDMA high speed switch is a low power switch.

In accordance with one or more aspects of the present disclosure, wherein the low power switch is configured for low power radio frequency applications of about 0 dBm or less.

In accordance with one or more aspects of the present disclosure, further including a time synchronization module connected to the at least one first TDMA high speed switch, the FDMA channelizer and the at least one second TDMA high speed switch and, wherein the output RF signal is output from the at least one switchless broadcast module at a predetermined frequency and amplitude based on the time synchronization module.

In accordance with one or more aspects of the present disclosure, wherein the time synchronization module is configured to effect a full bandwidth of the FDMA channelizer to be output to the antenna beam for the duration of a TDMA time frame.

In accordance with one or more aspects of the present disclosure, wherein the at least one first TDMA high speed switch has at least one first switch input configured to receive the input RF signal from at least one input source comprising a plurality of input beams.

In accordance with one or more aspects of the present disclosure, further including a first frequency converter connected between the at least one input source and the at least one first TDMA high speed switch and a second frequency converted connected between the at least one first TDMA high speed switch and the at least one channelizer input of the FDMA channelizer.

In accordance with one or more aspects of the present disclosure, further including a frequency converter connected between the first switch output of the at least one first TDMA high speed switch and the FDMA channelizer.

In accordance with one or more aspects of the present disclosure, further including a frequency converter connected between the at least one channelizer output of the FDMA channelizer and the second switch input of the at least one second TDMA high speed switch.

In accordance with one or more aspects of the present disclosure, wherein the at least one matrix power amplifier comprises a plurality of high power amplifiers.

In accordance with one or more aspects of the present disclosure, further including a first frequency converter connected between the at least one second TDMA high speed switch and the at least one matrix power amplifier, and a second frequency converter connected between the at least one channelizer output of the FDMA channelizer and the at least one second TDMA high speed switch.

In accordance with one or more aspects of the present disclosure, a method for communications including receiving an input radio frequency (RF) signal from at least one input source with at least one first time division multiple access (TDMA) high speed switch, transmitting the input RF signal from the at least one first TDMA high speed switch to a frequency division multiple access (FDMA) channelizer, receiving an output RF signal, from the FDMA channelizer, with at least one second TDMA high speed switch, transmitting the output RF signal from the at least one second TDMA high speed switch to a selected input of at least one matrix power amplifier, mapping the output RF signal from the selected input to a predetermined output of the matrix power amplifier, and outputting the output RF signal to the antenna beam corresponding to the predetermined output of the matrix power amplifier.

In accordance with one or more aspects of the present disclosure, further including providing a full bandwidth of the output RF signal from the FDMA channelizer to an antenna beam for a duration of a time division multiple access frame.

In accordance with one or more aspects of the present disclosure, further including converting a frequency of the input RF signal with a frequency converter connected between the at least one first TDMA high speed switch and the FDMA channelizer.

In accordance with one or more aspects of the present disclosure, further including converting a frequency of the output RF signal with a frequency converter connected between the FDMA channelizer and the at least one second TDMA high speed switch.

In accordance with one or more aspects of the present disclosure, further including converting a frequency of the input RF signal with a first frequency converter connected between the at least one input source and the at least one first TDMA high speed switch, and converting the input RF signal with a second frequency converter connected between the at least one first TDMA high speed switch and the FDMA channelizer.

In accordance with one or more aspects of the present disclosure, further including converting a frequency of the output RF signal with a first frequency converter connected between the FDMA channelizer and the at least one second TDMA high speed switch, and converting a frequency of the output RF signal with a second frequency converter connected between the at least one second TDMA high speed switch and the at least one matrix power amplifier.

In accordance with one or more aspects of the present disclosure, further including outputting the output RF signal from the at least one matrix power amplifier at predetermined frequency and amplitude based on a timing signal from a time synchronization module.

In accordance with one or more aspects of the present disclosure, further including effecting a full bandwidth of the FDMA channelizer to be output to the antenna beam for the duration of a TDMA time frame based on the timing signal from the time synchronization module.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A communication system comprising:
   at least one first time division multiple access (TDMA) high speed switch having a first switch output;
   a frequency division multiple access (FDMA) channelizer, coupled to the first switch output and configured to receive an input radio frequency (RF) signal from the at least one first TDMA high speed switch, the FDMA channelizer further having at least one channelizer output;
   at least one matrix power amplifier having at least one input and at least one output; and
   at least one second TDMA high speed switch having a second switch input coupled to a respective one of the at least one channelizer output and at least one second switch output coupled to a corresponding input of the at least one matrix power amplifier, the at least one second TDMA high speed switch being configured to receive an output RF signal from the FDMA channelizer and to transmit the output RF signal from the FDMA channelizer to a selected input of the at least one matrix power amplifier;
   wherein each input of the at least one matrix power amplifier is mapped to a predetermined output of the at least one matrix power amplifier and each predetermined output is coupled to a corresponding antenna beam.

2. The communication system of claim 1, wherein the coupling between the FDMA channelizer and the at least one second TDMA high speed switch and the coupling between the at least one second TDMA high speed switch the at least one matrix power amplifier are configured to provide a full bandwidth of the at least one channelizer output to the corresponding antenna beam for a duration of a time division multiple access frame.

3. The communication system of claim 1, wherein the at least one matrix power amplifier is common to more than one second TDMA high speed switch.

4. The communication system of claim 1, wherein the at least one second TDMA high speed switch is common to more than one matrix power amplifier.

5. The communication system of claim 1, wherein the at least one second high speed switch is a low power switch.

6. The communication system of claim 5, wherein the low power switch is configured for low power radio frequency applications of about 0 dBm or less.

7. The communication system of claim 1, further comprising a time synchronization module connected to the at least one first TDMA high speed switch, the FDMA channelizer and the at least one second TDMA high speed switch, and wherein the output RF signal is output from the at least one matrix power amplifier at a predetermined frequency and amplitude based on the time synchronization module.

8. The communication system of claim 7, wherein the time synchronization module is configured to effect a full bandwidth of the FDMA channelizer to be output to the antenna beam for the duration of a TDMA time frame.

9. The communication system of claim 1, further comprising a first frequency converter connected between at least one input source and at least one first switch input of the at least one first TDMA high speed switch and a second frequency converter connected between the first switch output of the at least one first TDMA high speed switch and the FDMA channelizer.

10. The communication system of claim 1, further comprising a frequency converter connected between the first switch output of the at least one first TDMA high speed switch and the FDMA channelizer.

11. The communication system of claim 1, further comprising a frequency converter connected between the at least one channelizer output of the FDMA channelizer and the second switch input of the at least one second TDMA high speed switch.

12. The communication system of claim 1, further comprising a first frequency converter connected between the at least one second switch output of the at least one second TDMA high speed switch and the at least one matrix power amplifier, and a second frequency converter connected between the FDMA channelizer and the second switch input of the at least one second TDMA high speed switch.

13. A method for communications comprising:
- receiving an input radio frequency (RF) signal from at least one input source with at least one first TDMA high speed switch;
- transmitting the input RF signal from the at least one first time division multiple access (TDMA) high speed switch to a frequency division multiple access (FDMA) channelizer;
- receiving an output RF signal, from the FDMA channelizer, with at least one second TDMA high speed switch;
- transmitting the output RF signal from the at least one second TDMA high speed switch to a selected input of at least one matrix power amplifier;
- mapping the output RF signal from the selected input to a predetermined output of the matrix power amplifier; and
- outputting the output RF signal to the antenna beam corresponding to the predetermined output of the matrix power amplifier.

14. The method of claim 13, further comprising providing a full bandwidth of the output RF signal from the FDMA channelizer to an antenna beam for a duration of a time division multiple access frame.

15. The method of claim 14, further comprising converting a frequency of the input RF signal with a frequency converter connected between the at least one first TDMA high speed switch and the FDMA channelizer.

16. The method of claim 14, further comprising converting a frequency of the output RF signal with a frequency converter connected between the FDMA channelizer and the at least one second TDMA high speed switch.

17. The method of claim 14, further comprising converting a frequency of the input RF signal with a first frequency converter connected between the at least one input source and the at least one first TDMA high speed switch, and converting the input RF signal with a second frequency converter connected between the at least one first TDMA high speed switch and the FDMA channelizer.

18. The method of claim 14, further comprising converting a frequency of the output RF signal with a first frequency converter connected between the FDMA channelizer and the at least one second TDMA high speed switch, and converting a frequency of the output RF signal with a second frequency converter connected between the at least one second TDMA high speed switch and the at least one matrix power amplifier.

19. The method of claim 14, further comprising outputting the output RF signal from the at least one matrix power amplifier at predetermined frequency and amplitude based on a timing signal from a time synchronization module.

20. The method of claim 19, further comprising effecting a full bandwidth of the FDMA channelizer to be output to the antenna beam for the duration of a TDMA time frame based on the timing signal from the time synchronization module.

* * * * *